United States Patent [19]

Yuasa et al.

[11] Patent Number: 5,332,521
[45] Date of Patent: Jul. 26, 1994

[54] FERROELECTRIC LIQUID CRYSTAL COMPOSITION, LIQUID CRYSTAL OPTICAL DEVICE PRODUCED BY USING THE FERROELECTRIC LIQUID CRYSTAL COMPOSITION, AND METHOD OF PRODUCING THE LIQUID CRYSTAL OPTICAL DEVICE

[75] Inventors: Kimihiro Yuasa; Satoshi Hachiya; Kazuharu Morita; Kenji Hashimoto, all of Kimitsu, Japan

[73] Assignee: Idemitsu Kosan Co., Ltd., Tokyo, Japan

[21] Appl. No.: 985,139

[22] Filed: Dec. 3, 1992

Related U.S. Application Data

[62] Division of Ser. No. 384,785, Jul. 25, 1989, Pat. No. 5,200,108.

[30] Foreign Application Priority Data

Jul. 26, 1988 [JP] Japan ................... 63-184673
Sep. 9, 1988 [JP] Japan ................... 63-224715
Feb. 22, 1989 [JP] Japan ................... 1-40287

[51] Int. Cl.$^5$ .................. C09K 19/52; G02F 1/13
[52] U.S. Cl. .................. 252/299.01; 252/299.65; 252/299.66; 252/299.67; 359/76; 359/90; 359/100; 359/104
[58] Field of Search .......... 252/299.01, 299.63, 252/299.65, 299.66, 299.67; 359/103, 104, 76; 529/100; 428/1

[56] References Cited

U.S. PATENT DOCUMENTS

| | | | |
|---|---|---|---|
| 4,844,835 | 7/1989 | Uchida et al. | 252/299.1 |
| 4,904,065 | 2/1990 | Yuasa et al. | 359/104 |
| 4,973,373 | 11/1990 | Hashimoto et al. | 359/36 |
| 4,988,460 | 1/1991 | Morita et al. | 252/299.5 |
| 5,200,108 | 4/1993 | Yuasa et al. | 252/299.01 |

Primary Examiner—Shean Wu
Attorney, Agent, or Firm—Antonelli, Terry, Stout & Kraus

[57] ABSTRACT

A ferroelectric liquid crystal composition comprising (A) a ferroelectric liquid crystal material and (B) a non-liquid-crystalline polymeric material;
  a liquid crystal optical device comprising a layer of the ferroelectric liquid crystal composition, the (A) ferroelectric liquid crystal material in the ferroelectric liquid crystal composition has been uniaxially oriented and two substrates which support the layer of the ferroelectric liquid crystal composition between them and carry on their surfaces facing each other their respective electrode layers, at least one of the electrode layers being a transparent electrode layer; and p1 a method of producing the liquid crystal optical device, which method comprises orienting a liquid crystal optical device yet to be oriented which includes a layer of the ferroelectric liquid crystal composition and
two flexible substrates which support the layer of the ferroelectric liquid crystal composition between them and carry on their surfaces facing each other their respective electrode layers, by subjecting the liquid crystal optical device yet to be oriented to a bending treatment.

24 Claims, 6 Drawing Sheets

FERROELECTRIC LIQUID CRYSTAL COMPOSITION, LIQUID CRYSTAL OPTICAL DEVICE PRODUCED BY USING THE FERROELECTRIC LIQUID CRYSTAL COMPOSITION, AND METHOD OF PRODUCING THE LIQUID CRYSTAL OPTICAL DEVICE

This application is a divisional application of application Ser. No. 384,785 filed Jul. 25, 1989 now U.S. Pat. No. 5,200,108.

BACKGROUND OF THE INVENTION (a) Industrial Field of the Invention

The present invention relates to a ferroelectric liquid crystal composition, a liquid crystal optical device produced by using the ferroelectric liquid crystal composition, and a method of producing the liquid crystal optical device. Particularly, the present invention relates to a ferroelectric liquid crystal composition which may be suitably used as the liquid crystal material for liquid crystal display devices, liquid crystal memory devices, liquid crystal speaker devices, etc., to a liquid crystal optical device produced by using the ferroelectric liquid crystal composition, and to a method of producing the liquid crystal optical device by which the liquid crystal optical device can be produced in a better yield through a simple process.

(b) Description of the Related Art

In recent years, liquid crystal optical devices in which a highly oriented ferroelectric liquid crystal is used as a liquid crystal material and supported between two electroded substrates have been attracting interest because of their excellent qualities, for example, high-speed response to external factors, such as electric field, and high contrast ratio, and accordingly, their use for liquid crystal display devices, liquid crystal memory devices, etc. has extensively increased.

However, in case of producing such liquid crystal optical devices by using a liquid crystal material comprising only ferroelectric liquid crystals, there have been raised problems that cell thickness cannot be increased, resulting in inviting occasional continuity defect, color shading due to birefringence interference, a tendency of bistability to become uneven, and the consequent difficulty in production of devices having large area.

In order to solve the problems, in Japanese Patent Application Kokai Koho No. 62-48789, there disclosed a method of controlling scattering of light by using a liquid crystal device which encloses a liquid crystal material having smectic phase and a medium encapsulating the liquid crystal material. However, the liquid crystal device is slow in responding to electric field (from several tens to several hundreds ms) because in the device, response to electric field is not conducted in smectic phase but in nematic phase, and smectic phase merely serves to maintain the state in nematic phase after the state is transformed from nematic phase by varying temperature. Further, the device has another problem that the contrast is low because light is switched between on-state and off-state by switching the mode of light between scattering state and non-scattering state.

In Japanese Patent Application Kohyo Koho No. 61-502128, there is disclosed a liquid crystal optical device which encloses a liquid crystal material comprising a liquid crystal matter dispersed in a transparent epoxy resin in a state encapsulated by the epoxy resin. The liquid crystal optical device also has the problems that it is slow in responding to electric field because the response to electric field is conducted in nematic phase and that the contrast is low because the switching of light between on-state and off-state is performed by switching the mode of light between scattering state and non-scattering state.

In Japanese Patent Application Kokai Koho No. 63-137211, there is disclosed a disperse system of a liquid crystal dispersed in resin matrix, and the disperse system is used as a blind by switching the light between scattering state and non-scattering state by applying electric field. However, the response time of the disperse system is also large because nematic liquid crystals are used as the liquid crystal matters, and enough contrast cannot be attained because the light switching system between on-state and off-state is perfomed by switching the light between scattering state and non-scattering state. The disperse system, therefore, is not enough to be used for display devices.

Further, in order to make ferroelectric liquid crystals fully exhibit its excellent qualities, it is necessary to highly orient the liquid crystal material, i.e. the ferroelectric liquid crystal, and therefore, there have been proposed various methods of controlling orientation.

For example, in case where a low molecular weight ferroelectric liquid crystal is used as a ferroelectric liquid crystal, the orientation has been controlled by using a rubbing technique, a shearing technique, a temperature gradient technique, a SiO oblique evaporation technique or the like.

However, production of liquid crystal optical devices using ferroelectric liquid crystals has not been put into practice although such devices are superior in high speed response property and memory capacity to the liquid crystal optical devices which use nematic liquid crystals and have been the mainstream of conventional liquid crystal optical devices. There are some reasons as described below.

(1) It is difficult to enlarge the area of a device since the cell-thickness of a device should be adjusted to not more than several $\mu$m.

(2) In the method of controlling orientation by previously coating a substrate with a polymer (polyimide, etc.) and subjecting the polymer layer to rubbing treatment or the like, there are deficiencies such as the complicated pre-operation and pre-adjustment of the substrates, and further, the usual use of glass substrates requires the producing apparatus including complicated conveyer means to be maintained extremely clean and also makes the realization of continuous production difficult.

(3) There are few liquid crystals which exhibit ferroelectric liquid crystal phase (chiral smectic C phase) which is thermodynamically stable at temperatures neighboring room temperature.

For example, in Japanese Patent Application Kokai Koho No. 63-25622, there is disclosed a method for lessening the change of the structure of liquid crystal caused by temperature change, by mixing a ferroelectric low molecular weight liquid crystal with a thermoplastic resin to improve the formability of the liquid crystal material into film and to make it exhibit ferroelectric phase at temperatures neighboring room temperature. However, the method requires specified combination of resins and liquid crystals to attain the thermodynamic stability of ferroelectric phase, and the orienting treatment in the method should be conducted by using rubbing technique or the like which make the process complicated and make enlargement of area difficult. Further, there is a problem that the conventional rubbing technique or the like cannot produce sufficient orientation state. Furthermore, the method is poor in productivity because production of the above-mentioned composite film should be conducted by dry-and-wet film-forming technique, water-surface-spreading technique or the like and therefore, several sheets of the film should be laminated for producing electrically optical devices.

In Japanese Patent Application Kokai Koho No. 63-109418, there is disclosed a composite liquid crystal material consisting of non-liquid-crystalline polymeric material and a ferroelectric low molecular weight liquid crystal. However, because the formability of the composite liquid crystal material into film relies only upon the polymeric material, there are problems that it is difficult to produce thin film of less than several μm in thickness and that the mechanical strength of the produced device is insufficient. There is further problems that the stretching technique, which is employed in the method for controlling the orientation state of liquid crystal, is not enough to highly orient low molecular weight liquid crystals and makes full exhibition of histability difficult because low molecular weight liquid crystals orient along the polymeric material being oriented by stretching.

In Japanese Patent Application Kokai Koho No. 63-109149, there is disclosed another method for obtaining a composite film containing oriented liquid crystal. In the method, a liquid crystal is mixed with a polymeric material to produce a composite film, and the composite film is oriented by uniaxially stretching it and subsequently, heating it to a temperature at which the liquid crystal exhibits isotropic phase and then cooling the heated composite film, whereby omitting some steps including the step of dispersing spacing materials at the time of producing ferroelectric liquid crystal panels, the step of coating orientation layer, the step of rubbing treatment, and the step of injection of liquid crystal. However, since the orienting mechanism employed in the method is similar to rubbing treatment in which the liquid crystal molecules are oriented along the polymer oriented by uniaxial stretching, the method has problems that the productivity is poor because of the essential slow-cooling from isotropic temperature, that the liquid crystal material cannot be highly oriented resulting in the low contrast of the obtained device, that the stretched composite film cannot be supported between two substrates without difficulty because, for example, air bubbles are apt to be caught simultaneously, that the optimum combination of ferroelectric liquid crystals and polymeric materials should be selected because the degree of orientation varies depending on the kinds of ferroelectric liquid crystals and polymeric materials.

SUMMARY OF THE INVENTION

An object of the present invention is to provide a ferroelectric liquid crystal composition which at the time of producing a liquid crystal optical device, exhibits excellent formability into film and high orientation efficiency, and after production of liquid crystal optical device, exhibits excellent mechanical strength, such as dimensional stability and shock resistance, high-speed response to electric field and can attain high contrast ratio, and to provide a liquid crystal optical device produced by using the ferroelectric liquid crystal composition.

Another object of the present invention is to provide a liquid crystal optical device which reduces apparent retardation value even if the cell thickness is large, rarely shows coloration or color shading, and has excellent bistability and excellent dimensional and orientation stability against deformation.

Another object of the present invention is to provide a method of producing liquid crystal optical devices which is practically advantageous in that, for example, liquid crystal optical devices can be continuously mass-produced by a simple process in a better yield regardless of the size of their area, and that a high degree of orientation can be attained easily without any particular pretreatment of substrates for orientation control.

Another object of the present invention is to provide a method of producing liquid crystal optical devices which makes it possible to produce, through a simple process, high contrast liquid crystal optical devices which are independent of the optical anisotropy of substrates.

Another object of the present invention is to provide a method of producing liquid crystal optical devices which permits polarizing plates for liquid crystal optical devices to be used efficiently without wasted portion.

Accordingly, the present invention provides a ferroelectric liquid crystal composition comprising a ferroelectric liquid crystal material and a non-crystalline polymeric material.

The present invention further provides a liquid crystal optical device comprising
  a layer of ferroelectric liquid crystal composition comprising (A) a ferroelectric liquid crystal material and (B) a non-liquid-crystalline polymeric material, the (A) ferroelectric liquid crystal material being uniaxially oriented and
  two electrode layers which support the layer of ferroelectric liquid crystal composition between them, at least one of the electrode layers being a transparent electrode layer.

The present invention further provides a liquid crystal optical device comprising
  a layer of a ferroelectric liquid crystal composition comprising (A) a ferroelectric liquid crystal material and (B) a non-crystalline polymeric material, the (A) ferroelectric liquid crystal material being uniaxially oriented and
  two substrates which support the layer of ferroelectric liquid crystal composition between them and carry on their surfaces facing each other their respective electrode layers, at least one of the electrode layers being a transparent electrode layer.

The present invention further provides a method of producing a liquid crystal optical device yet to be oriented which includes
  a layer of a ferroelectric liquid crystal composition comprising (A) a ferroelectric liquid crystal material and (B) a non-liquid-crystalline polymeric material and
  two substrates which support the layer of ferroelectric liquid crystal composition between them and carry on their surfaces facing each other their respective electrode layers,
which method comprises orienting the ferroelectric liquid crystal material by subjecting the liquid crystal optical device yet to be oriented to a bending treatment.

The present invention further provides a method of producing a liquid crystal optical device, which method comprises providing a layer of a ferroelectric liquid crystal composition comprising a ferroelectric liquid crystal material and a resin having crosslinking ability on the electrode layer of a substrate carrying electrode layer, laminating an opposite substrate carrying electrode layer on the substrate carrying electrode layer which has been provided on its electrode layer with the layer of the ferroelectric liquid crystal composition, so that the layer of the ferroelectric liquid crystal composition lies between the electrode layers, and crosslinking the resin having crosslinking ability.

The present invention further provides a method of producing a liquid crystal optical device, which method comprises, in sequence, providing a layer of a ferroelectric liquid crystal composition comprising a ferroelectric liquid crystal material and a resin having crosslinking ability on the electrode layer of a substrate carrying electrode layer, laminating an opposite substrate carrying electrode layer on the substrate carrying electrode layer which has been provided, on its electrode layer, with the layer of the ferroelectric liquid crystal composition, so that the layer of the ferroelectric liquid crystal composition lies between the electrode layers, to obtain a liquid crystal optical device yet to be oriented, uniaxially orienting the ferroelectric liquid crystal composition enclosed in the liquid crystal optical device yet to be oriented, and crosslinking the resin having crosslinking ability enclosed in the oriented liquid crystal optical device.

BRIEF DESCRIPTION OF THE DRAWINGS

FIG. 3(a) is a schematic view illustrating a liquid crystal optical device being subjected to a bending treatment, and FIG. 3(b) is a partially enlarged view of the bended part and the neighborhood.

Each of FIG. 7

Each of FIG. 11

DESCRIPTION OF THE PREFERRED EMBODIMENTS

Figure 1:
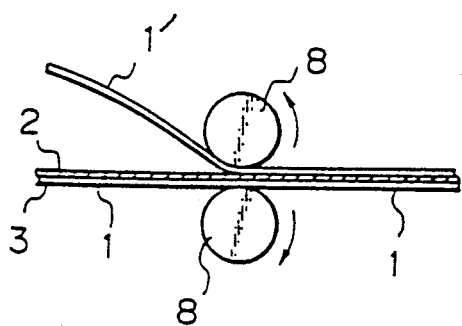
FIG. 1 is a schematic view illustrating a method of producing a liquid crystal optical device by lamination which may be suitably employed as the pre-step previous to the orienting step in the present invention.

There is no particular limit in the ferroelectric liquid crystal material to be used in the present invention so long as it is a ferroelectric liquid crystal material capable of exhibiting chiral smectic C phase (SmC* phase).

Some examples of such a ferroelectric liquid crystal material include one kind of ferroelectric low molecular weight liquid crystal; a mixture of two or more kinds of ferroelectric low molecular weight liquid crystals; a liquid crystal mixture having ferroelectricity which consists of one or more kinds of ferroelectric low molecular weight liquid crystal and one or more kinds of non-ferroelectric low molecular weight liquid crystals; one kind of ferroelectric polymeric liquid crystal; a mixture of two or more kinds of ferroelectric polymeric liquid crystals; a liquid crystal mixture having ferroelectricity which consists of one or more kinds of ferroelectric low molecular weight liquid crystals and one or more kinds of ferroelectric polymeric liquid crystals; a liquid crystal mixture having ferroelectricity which consists of one or more kinds of ferroelectric low molecular weight liquid crystals and one or more kinds of non-ferroelectric polymeric liquid crystals; a liquid crystal mixture having ferroelectricity which consists of one or more kinds of ferroelectric polymeric liquid crystals and one or more kinds of non-ferroelectric polymeric liquid crystals; a liquid crystal mixture having ferroelectricity which consists of one or more kinds of ferroelectric polymeric liquid crystals, one or more kinds of ferroelectric low molecular weight liquid crystals, and one or more kinds of non-ferroelectric polymeric liquid crystals; a liquid crystal mixture having ferroelectricity which consists of two or more non-ferroelectric low molecular weight liquid crystals; a liquid crystal mixture having ferroelectricity which consists of two or more non-ferroelectric polymeric liquid crystal; a liquid crystal mixture having ferroelectricity which consists of one or more non-ferroelectric low molecular weight liquid crystals and one or more non-ferroelectric polymeric liquid crystals; and a liquid crystal mixture having ferroelectricity which consists of one or more non-ferroelectric low molecular weight liquid crystals and/or one or more non-ferroelectric polymeric liquid crystals and one or more chiral dopants.

Among various kinds of ferroelectric polymeric liquid crystals, the preferred are side-chain-type ferroelectric polymeric liquid crystals which exhibit chiral smectic C phase.

Some illustrative examples of the side-chain-type ferroelectric liquid crystals which can be suitably used in the present invention include the polymers and copolymers having the repeating units represented by the following general formulas.

[I] Polyacrylate-type ferroelectric polymeric liquid crystals (These are disclosed in Japanese Patent Application Kokai Koho No. 63-99204 and No. 63-273608)

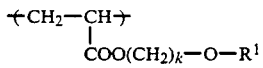

wherein
k is an integer having a value of 1 to 30,
R¹ is

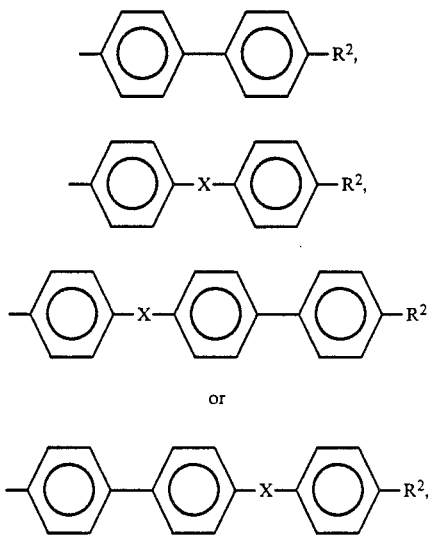

or

X is —COO— or —OCO—,
R² is —COOR³, —OCOR³, —OR³ or —R³, wherein R³ is

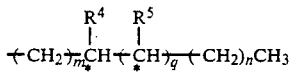

wherein
each of m and n is independently an integer having a value of 0 to 9.
q is an integer having a value of 0 or 1.
each of R⁴ and R⁵ is independently —CH₃, a halogen atom or —CN, with the proviso that when R⁵ is —CH₃, n is not an integer having a value of 0, and C* represents an asymmetric carbon atom.

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as an elongated response time. The particularly preferred range of number average molecular weight cannot be uniformly defined because it depends on the kind of R¹, the value of k, the optical purity of R³, etc., but it is generally from 1,000 to 200,000.

The polymers may be generally prepared by polymerizing the monomers represented by the following general formula

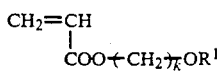

wherein k and R¹ are as defined above, using a known polymerization method.

Relating to the liquid crystals represented by the following formula, which are some examples of the polyacrylate-type ferroelectric polymeric liquid crystals, the temperatures at which they exhibit chiral smectic C phase (T$_{sc}$*) and their average molecular weights (Mn) are shown below.

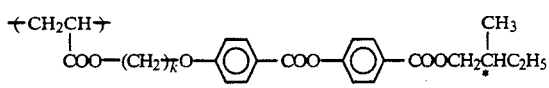

(a) k = 12, Mn = 5300, Tsc* : 5–12° C.
(b) k = 14, Mn = 6500, Tsc* : 13–31° C.

Other typical examples of polyacrylate-type ferroelectric polymeric liquid crystals are shown below.

Polymethacrylate-type ferroelectric polymeric liquid crystals

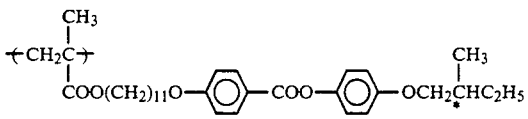

(J. C. Dubois et al., Mol. Cryst. Liq. Cryst., 1986, 137, 349)

Polychloroacrylate-type ferroelectric polymeric liquid crystals

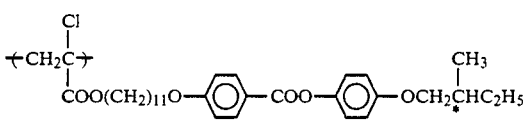

(J. C. Dubois et al., Mol. Cryst. Liq. Cryst., 1986, 137, 349)

[II] Polyether-type ferroelectric polymeric liquid crystals (These are disclosed in Japanese Patent Application Kokai Koho No. 63-264629)

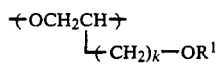

wherein k and R¹ are as defined above in [I].

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as an elongated response time. The particularly preferred range of the number average molecular weight cannot be uniformly defined because it depends on the kind of R¹, the value of k, the optical purity of R³, etc., but it is generally from 1,000 to 200,000.

The polymers may be generally prepared by polymerizing the monomers represented by the following general formula

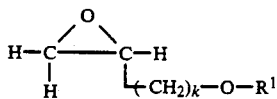

wherein k and $R^1$ are as defined above, using a known polymerization method.

Relating to the liquid crystals represented by the following formula, which are some examples of the polyether-type ferroelectric polymeric liquid crystals, the temperatures at which they exhibit chiral smectic C phase ($T_{sc}^*$) and their average molecular weights (Mn) are shown below.

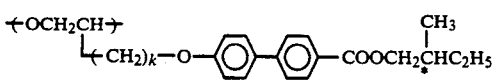

(a) k = 8, Mn = 2800, Tsc* : 24–50° C.
(b) k = 10, Mn = 2400, Tsc* : 19–50° C.

Another typical example of the polyether-type ferroelectric polymeric liquid crystal are shown below.

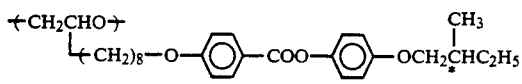

[III] Polysiloxane-type ferroelectric polymeric liquid crystals (These are disclosed in Japanese Patent Application Kokai Koho No. 63-280742)

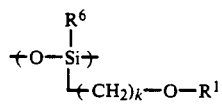

wherein $R^6$ is a lower alkyl radical and k and $R^1$ are as defined above.

The number average molecular weights of the polymers are preferably 1,000 to 400,000. A number average molecular weight less than 1,000 may sometimes decrease the application formability into films and, on the other hand, a number average molecular weight of more than 400,000 may sometimes cause undesirable results such as a lowered speed of response to electric field. The particularly preferred range of the number average molecular weight cannot be uniformly defined because it depends on the kind of $R^1$, the values of k, m, and n, the optical purity of $R^3$, etc., but it is generally from 1,000 to 200,000.

The polymers may be generally prepared by reacting an alkylhydropolysiloxane represented by the following general formula

wherein $R^6$ is as defined above, with a liquid crystal unit compound represented by the following formula

wherein $R^1$ and k are as defined above, under a specified condition.

Relating to the liquid crystals represented by the following formula, which are some examples of the polysiloxane-type ferroelectric polymeric liquid crystals, the temperatures at which they exhibit chiral smectic C phase ($T_{sc}^*$) and their average molecular weights (Mn) are shown below.

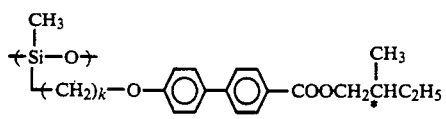

(a) k = 6, Mn = 16400, Tsc* : 70–90° C.
(b) k = 8, Mn = 15000, Tsc* : 39–91° C.

Another typical example of the polysiloxane-type ferroelectric polymeric liquid crystal is shown below.

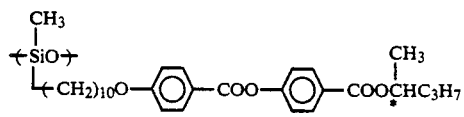

[IV] Polyester-type ferroelectric polymeric liquid crystals (These are disclosed in Japanese Patent Application Kokai Koho No. 62-219225)

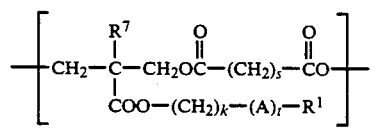

wherein $R^7$ is —H, —$CH_3$ or —$C_2H_5$,
s is an integer having a value of 1 to 20,
A is —O— (oxygen) or —COO—,
t is an Integer having a value of 0 or 1, and
$R^1$ and k are as defined above or

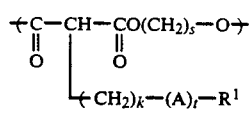

wherein s, A, t, $R^1$, and k are as defined above.

These polymers may be prepared by employing the methods generally employed for polycondensing polyesters. That is, these polymers may be prepared by polycondensing a dibasic acid or an acid chloride therefrom with a dihydric alcohol corresponding to the above structures.

The number average molecular weights of the polymers are preferably 1,000 to 400,000. A number average molecular weight less than 1,000 may sometimes decrease the application formability into films and, on the Other hand, a number average molecular weight of more than 400,000 may sometimes cause undesirable results such as a lowered speed of response to electric field. The particularly preferred range of the number average molecular weight cannot be uniformly defined because it depends on the kind of $R^2$, the value of k, the optical purity of $R^3$, etc., but it is generally from 1,000 to 200,000.

Other typical examples of the polyester-type ferroelectric polymeric liquid crystal are shown below.

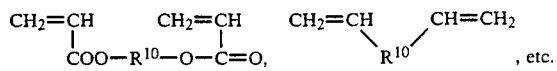

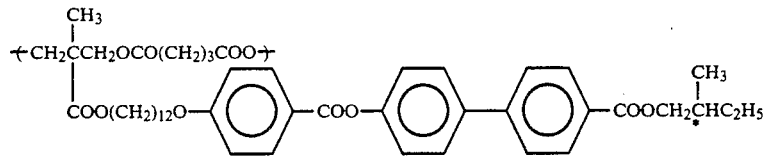

(This polymer is disclosed in Japanese Patent Application Kokai Koho No. 1-113424.)

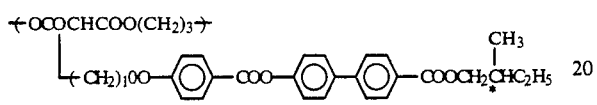

(This polymer is disclosed in Japanese Patent Application Kokai Koho No. 64-22918.)

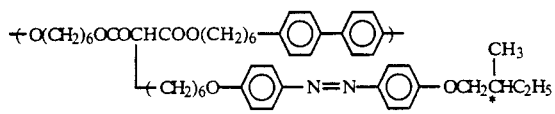

(R. Zentel et al. Liq. Cryst. 1987, 2, 83)

[V] Copolymers comprising one or more of the repeating units of the above-described [I] polyacrylate type polymers, [II] polyether type polymers, [III] polysiloxane type polymers, and [IV] polyester type polymers and one or more other repeating units Some illustrative examples of such copolymers are shown below.

(1) Copolymers comprising the repeating unit of [I] and one or more repeating units represented by the following formulas

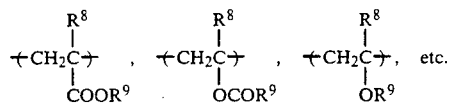

wherein
$R^8$ is —H, —CH$_3$, —Cl, F, Br or I and
$R^9$ is an alkyl or aryl of $C_{1\text{-}10}$.

The number average molecular weights of the copolymers are generally 1,000 to 400,000, preferably 1,000 to 200,000.

The content of the repeating unit of [I] is preferably 20 to 90%.

(2) Copolymers prepared by copolymerizing a monomer represented by the following formula

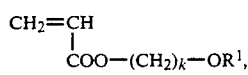

which is the precursor of the repeating unit of [I], with one or more monomers represented by the following formulas wherein $R^{10}$ is an alkyl or aryl of $C_{1\text{-}20}$.

(3) Copolymers comprising the repeating unit of [I] and the repeating unit represented by the following formula

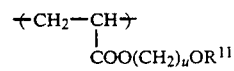

wherein u is an integer having a value of 1 to 30,
$R^{11}$ is

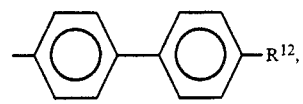

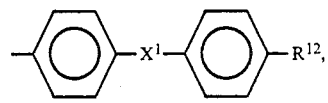

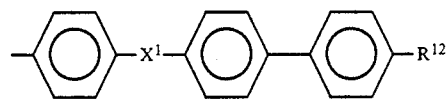

or

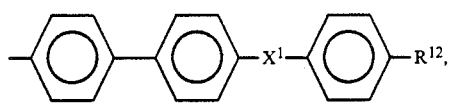

$X^1$ is —COO—, —OCO— or —CH=N—,
$R^{12}$ is —COOR$^{13}$, —OCOR$^{13}$, —OR$^{13}$ or —R$^{13}$, and
$R^{13}$ is an alkyl, fluoroalkyl or chloroalkyl of $C_{1\text{-}10}$.

The ferroelectric polymeric liquid crystals which may be used in the present invention are not limited to those having one or two asymmetric carbon atoms in the end portion of each side chain, and those having three or more asymmetric carbon atoms in the end portion of each side chain also may be used.

The ferroelectric polymeric liquid crystals further include, for example, a blend of one or more polymers each having a proton donor and/or a proton acceptor and one or more ferroelectric low molecular weight liquid crystals (These are disclosed in WO 088/00606).

Some examples of such ferroelectric polymeric liquid crystals include those wherein one or more of the low molecular weight liquid crystals described below and polyvinylacetate are bonded by hydrogen bond to form a polymeric state.

The side chains (mesogen) of the above-described ferroelectric polymeric liquid crystals have various skeletons known in low molecular weight liquid crystals, for example biphenyl skeleton, phenyl benzoate skeleton, biphenyl benzoate skeleton or phenyl 4-phenyl benzoate skeleton. Each of the benzene rings in these skeletons may be replaced with another ring such as pyrimidine ring, pyridine ring, pyridine ring, cyclohexane ring or dioxoborinane ring, or may have halogen substituting radicals such as fluorine or chlorine. Also, the optically active radicals may be replaced by 1-methylalkyl radicals, 2-fluoroalkyl radicals, 2-chloroalkyl radicals, 2-chloro-3-methylalkyl radicals, 2-trifluoromethylalkyl radicals, 1-alkoxycarbonylethyl radicals, 2-alkoxy-1-methylethyl radicals, 2-alkoxypropyl radicals, 2-chloro-1-methylalkyl radicals, 2-alkoxycarbonyl-1-trifluoromethylpropyl radicals or the like. The length of the spacer also may vary within the range of 1 to 30 carbon atoms so long as the polymer can exhibit ferroelectricity.

Some examples of the ferroelectric low molecular weight liquid crystals which may be used in the present invention include the following compounds.

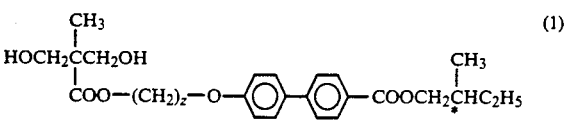

wherein z is an integer having a value of 3 to 30.

(2) 2-methylbutyl 4-[4'-{12-(2,2-dimethylolpropionyloxy)dodecyloxy}benzoyloxy]benzoate (3) 2-methylbutyl 4-[4'-{12-(2,2-diacetoxypropionyloxy)dodecyloxy}benzoyloxy]benzoate (4) 2-methylbutyl 4'-[12-(2,2-dimethylolpropionyloxy)-dodecyloxy]biphenyl-4-carboxylate (5) 2-methylbutyl 4'-[12-(2,2-diacetoxyproplonyloxy)-dodecyloxy]biphenyl-4-carboxylate (6) 2-methylbutyl 4'-[4''-{12-(2,2-dimethylolpropionyloxy)-dodecyloxy}benzoyloxy]biphenyl-4-carboxylate (7) 2-methylbutyl 4'-[4''-{12-(2,2-diacetoxyproplonyloxy)dodecyloxy}benzoyloxy]biphenyl-4-carboxylate (8) 2-methylbutyl 4-[4''-{12-(2,2-dimethylolpropionyloxy)dodecyloxy}biphenylyl-4'-carbonyloxy]-benzoate (9) 2-methylbutyl 4-[4'''-{12-(2,2-diacetoxyproplonyloxy)dodecyloxy}biphenylyl-4'-carbonyloxy]benzoate

(10) DOBAMBC (p-decyloxybenzyildene-amino-2-methylbutyl cinnamate)

(11) 2-methylbutyl 4'-octyloxybiphenyl-4-carboxylate

(12) 2-methylbutyl 4-(4''-octyloxybiphenylyl-4'-carbonyloxy)benzoate

(13) 4-(2-methylbutyloxy)phenyl 4-octyloxybenzoate

(14) 3-methyl-2-chloropentyl 4'-octyloxybiphenyl-4-carboxylate

(15) 4'-octyloxybiphenyl-4-yl 3-methyl-2-chloropentanoate

(16) p-hexyloxybenzylidene-p'-amino-2-chloropropyl cinnamate

(17) 4-(2-methylbutylbenzylidene)-4'-octylaniline

As described above, the ferroelectric liquid crystal material to be used in the present invention may also be a mixture of ferroelectric polymeric liquid crystals and/or ferroelectric low molecular weight liquid crystals with non-ferroelectric polymeric liquid crystals so long as the composition exhibits ferroelectricity.

Some examples of the above-mentioned nonferroelectric polymeric liquid crystals which may be contained in the ferroelectric liquid crystal materials of the present invention include various kinds of polymeric liquid crystals which exhibit smectic phase, nematic phase, or cholesteric phase.

Some typical examples of the non-ferroelectric polymeric liquid crystals which exhibit smectic phase include the following polymeric liquid crystals.

(1) Polyacrylate-type polymeric liquid crystal

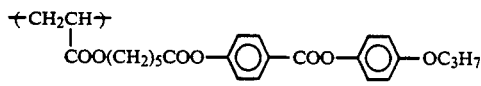

(Y. S. Freidzon, Polymer Commun., 1986, 27, 190)

(2) Polymethacrylate-type polymeric liquid crystal

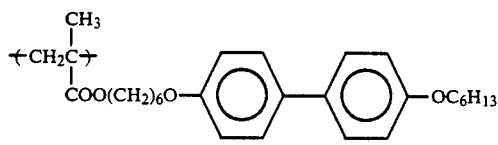

(H. Finkelmann, Makromol. Chem., 1978, 179, 2451)

(3) Polyoxtrane-type polymeric liquid crystal

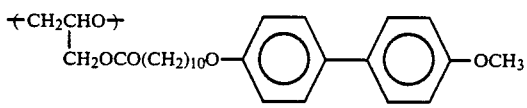

(C. Pugh, Polymer Bulletin, 1986, 16, 521)

(4) Polysiloxane-type polymeric liquid crystal

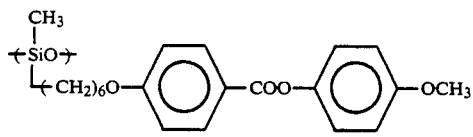

(H. Richard, Mol. Cryst. Liq. Cryst., 1988, 155, 141)

(5) Polyester-type polymeric liquid crystal

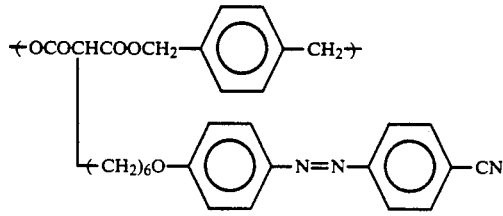

(M. Eich, Macromol. Chem., Rapid Commun., 1987, 8, 59)

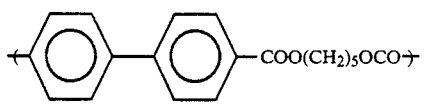

(Junji Watanabe, Collected papers for lectures for the fourteenth Liquid Crystal Symposium, 1988, 258)

The mesogenic portion of each of the above polymeric liquid crystals may be replaced with various skeleton known in low molecular weight liquid crystals such as biphenyl skeleton, phenyl benzoate skeleton, biphenyl benzoate skeleton, and phenyl 4-phenyl benzoate skeleton. Further, each of tile benzene rings in each of the skeletons may be replaced by pyrimidine ring, pyridine ring, pyridazine ring, cyclohexane ring, dioxoborinane ring, or the like, and also may have halogen substituting radicals such as fluorine or chlorine radical. The end radicals may also be replaced by linear or branched alkyl radicals, haloalkyl radicals, cyano radical or the like. The length of the spacers may vary within the range of methylene-chain length of 1 to 30 so long as smectic phase can be exhibited. The preferred molecular weight is from 1,000 to 1,000,000. The smectic polymeric liquid crystal which may be used in the present invention can be readily prepared by substituting the optically active radicals of the ferroelectric polymeric liquid crystals disclosed in Japanese Patent Application Kokai Koho No. 63-99204 and No. 63-264629 with optically non-active radicals.

Some examples of the nematic and cholesteric polymeric liquid crystals which may be used In the present invention include the following polymeric liquid crystals.

Nematic polymeric liquid crystals (1) Polyacrylate-type polymeric liquid crystal

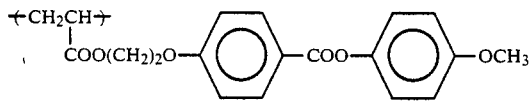

(H. Ringsdoff, Makromol. Chem., Rapid Commun., 1982, 3, 557)

(2) Polymethacrylate-type polymeric liquid crystal

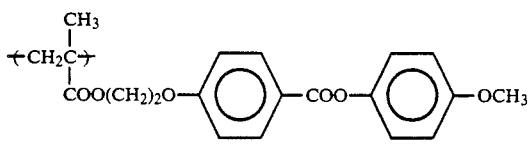

(H. Finkelmann, Makromol. Chem., 1978, 179, 273)

(3) Polysiloxane-type polymeric liquid crystal

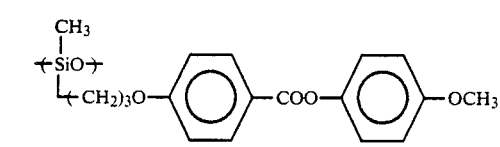

(H. Finkelmann, Makromol. Chem., Rapid Commun., 1980, 1, 31)

Cholesteric polymeric liquid crystals (1) Polyacrylate-type polymeric liquid crystal

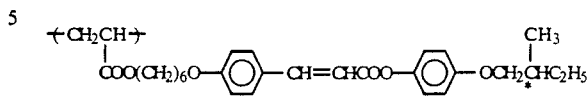

(J. M. Gugllelminetti, Polymer Bull., 1986, 16411)

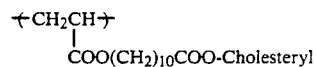

(V. P. Shibaev, Pure & Appl. Chem., 1985, 6, 57)

(2) Polymethacrylate-type Polymer liquid crystal

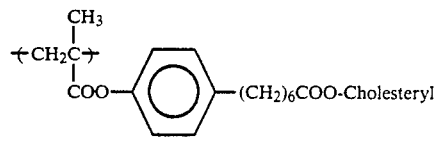

(H. Finkelmann, Makromol. Chem. 1978, 179, 829)

(3) Polysiloxane-type polymeric liquid crystal

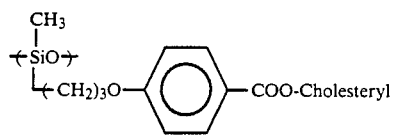

(G. M. Janini, Makromol. Chem. Rapid Commun., 1985, 6, 57)

The mesogenic portions of each of the above polymeric liquid crystals may be replaced by various skeletons known in low molecular weight liquid crystals such as biphenyl skeleton, phenyl benzoate skeleton, biphenyl benzoate skeleton, and phenyl 4-phenyl benzoate skeleton. Further, each of the benzene rings in each of the skeletons may be replaced by pyrimidine ring, pyridine ring, pyridazine ring, cyclohexane ring, dioxoborinane ring, or the like, and also may have halogen substituting radicals such as fluorine and chlorine radical. The end radicals may also be replaced by linear or branched alkyl radicals, haloalkyl radicals or cyano radical. Some examples of the non-liquid-crystalline polymeric material to be used in the ferroelectric liquid crystal composition of the present invention include the following thermoplastic resins and resins having crosslinking ability. The non-liquid-crystalline polymeric materials may be used individually or as a mixture or two or more of them. Also, the non-liquid-crystalline polymeric materials may be homopolymers of copolymers. When a mixture of a thermoplastic resin and a resin having crosslinking ability is used, the non-liquid-crystalline polymeric material preferably contains the resin having crosslinking ability in a ratio of 50% by weight or more.

Among these non-liquid-crystalline polymeric materials, those commonly used as adhesive are particularly suitably used because they can securely fix the liquid crystal layer to substrates and can effectively improve the strength of liquid crystal devices. Such adhesives include some thermoplastic resins and some resins having crosslinking ability.

The preferred thermoplastic resins are those having a Tg (glass transition temperature) of not lower than 30° C., more preferably not lower than 70° C.

Some illustrative examples of the thermoplastic resins to be used in the present invention include polymers or copolymers of vinyl halide, for example, polyvinylchloride, polyvinylbromide, polyvinylfluoride, vinyl chloride-vinyl acetate copolymer, vinyl chloride-ethylene copolymer, vinyl chloride-propylene copolymer, vinyl chloride-vinylidene chloride copolymer, vinyl chloride-butadiene copolymer, vinyl chloride-acrylic ester copolymers, vinyl chloride-acrylonitrile copolymer, vinyl chloride-styrene-acrylonitrile terpolymer, vinyl chloride-vinyltdene chloride-vinyl acetate terpolymer, polyvinylidenechloride, polytetrafluoroethylene, polytetrafluorochloroethylene, and polyfluorovinylidene;

polymers or copolymers of unsaturated alcohols or unsaturated ethers, for example, polyvinylalcohol, polyallylalcohol, polyvinylethers, and polyallylethers;

polymers or copolymers of unsaturated carboxylic acids, for example, acrylic acid or methacrylic acid;

polymers or copolymers of ester compounds having an unsaturated bond in the part of alcohol remaining after esterification, for example, polyvinylesters, such as polyvinylacetate, and polyallylesters, such as polyphthalic acid;

polymers or copolymers of ester compounds having an unsaturated bond in the part of acid remaining after esterification or in both the part of acid and the part of alcohol each remaining after esterification, for example, polyacrylic esters, polymethacrylic esters, polymaleic esters, and polyfumarlc esters;

polymers or copolymers of unsaturated nitriles, for example, polymer or copolymers of acrylonitrile, polymer or copolymers of methacrylonitrile, polyvinylidenecyanide, polymer or copolymers of malononitrile, and polymer or copolymers of fumaronitrile;

polymers or copolymers of aromatic vinyl compounds, for example, polystyrene, poly-α-methylstyrene, poly-p-methylstyrene, styrene-α-methylstyrene copolymer, styrene-p-methylstyrene copolymer, polyvinylbenzene, and polystyrene halides;

polymers or copolymers of heterocyclic compounds, for example, polyvinylpyridine, poly-N-vinylpyrolidine, and poly-N-vinylpyrolidine;

polyester condensation polymers, for example, polycarbonates, and polyamide condensation polymers, for example, nylon 6 and nylon 6,6;

polymers or copolymers each containing one or more kinds of units selected from maleic anhydride unit, maleimide unit, and fumaric acid unit; and heat-resisting organic high molecular weight compounds, for example, polyamide-imides, polyetherimides, polyimides, polyphenyleneoxide, polyphenylenesulfide, polysulfone, polyethersulfons, and polyallylate.

The compatibility of the thermoplastic resins with the liquid crystals may be either large or small because the thermoplastic resin is to be used as a structural material.

As the resin having crosslinking ability to be used in the present Invention, epoxy resins, unsaturated polyester resins, and silicone resins having crosslinking ability can be suitably used. Herein, the resins having crosslinking ability also include those containing curing agent such as amines or acid anhydrides for epoxy resins and styrene for unsaturated polyester resins.

Some typical examples of the resins having crosslinking ability are shown below.

Epoxy resin

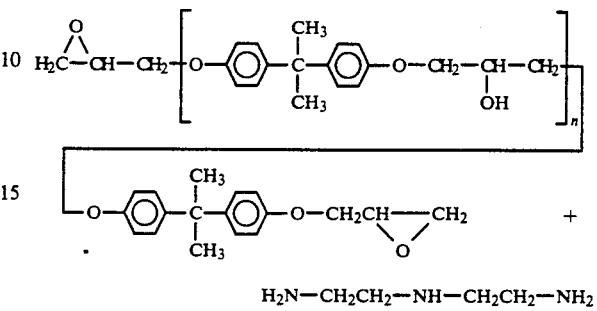

$H_2N-CH_2CH_2-NH-CH_2CH_2-NH_2$

Unsaturated polyester resin

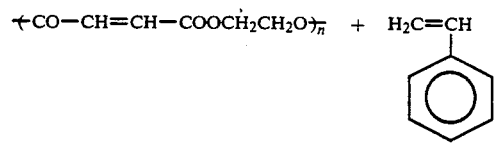

Silicone resin

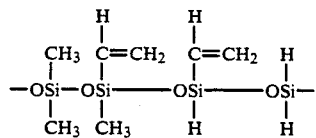

Among the non-liquid-crystalline polymeric materials, those which are particularly suitable for the composition of the present invention are polymeric materials commonly used as adhesives, for example epoxy adhesives, acrylic adhesives, unsaturated polyester adhesives, polyurethane adhesives, hot-melt adhesives, and elastomer adhesives.

The preferred epoxy adhesives are those containing bisphenol A-type main agents. Also, those containing the following main agents wherein the part of bisphenol A is converted as follows may be used.

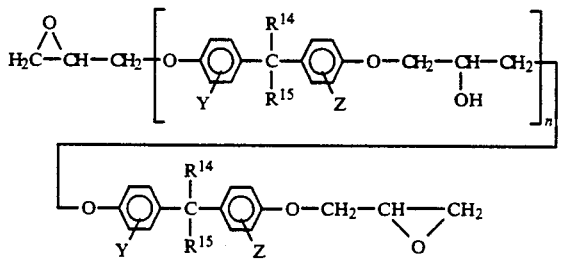

That is, the preferred main agents of epoxy adhesives are the epoxy compounds represented by the above general formula wherein $R^{14}$ and $R^{15}$ are methyl radicals (bisphenol A-type), wherein $R^{14}$ is methyl radical and $R^{15}$ is ethyl radical, wherein $R^{14}$ is methyl radical and $R^{15}$ is isopropyl radical, wherein $R^{14}$ is methyl radical and $R^{15}$ is isobutyl radical, wherein $R^{14}$ is methyl radical and $R^{15}$ is heptyl radical, wherein $R^{14}$ is methyl radical and $R^{15}$ is nonyl radical, wherein both $R^{14}$ and $R^{15}$ are propyl radicals, wherein $R^{14}$–$R^{15}$ is butylidene radical, pentylidene radical, 2-methylpentylidene radical or 3-methylpentylidene radical, or wherein both $R^{14}$ and $R^{15}$ are methyl radicals and Y and Z are methyl radicals.

Some examples of the curing agents for epoxy compounds which may be used In the present invention include diethylene triamine, triethylene tetramine, xylylene diamine, diaminodiphenylmethane, polyamide resins, dicyandiamide, boron trifluoride-amine complex, triethanolamine borate, hexahydrophthalic anhydride, phthalic anhydride, maleic anhydride, polysulfides, and resol. The epoxy adhesives may either be one component adhesives or two component adhesives.

Some examples of acrylic adhesives which may be used in the present invention include a mixture of an acrylic ester with a polymerization initiator (The mixture is cured by heating or photo-irradiation.) and a combination of a modified acrylic ester and a primer (These are cured by contacting to each other.).

Some examples of unsaturated polyester adhesives which may be used in the present invention include a mixture of a polyester containing maleic acid units with a monomer, such as vinylbenzene, acrylic esters, methacrylic esters or vinyl acetate, and a polymerization initiator (The mixture is cured by heating or photo-irradiation.).

Some examples of polyurethane adhesives which may be used in the present invention include those containing, as the isocyanate component, methylenebis(p-phenylenediisocyanate, tolylenediisocyanate, hexamethylenediisocyanate, 1-chlorophenyldiisocyanate, 1,5-naphthylenediisocyanate, thiodipropyldiisocyanate, ethylbenzene-α-2-diisocyanate, 4,4,4-trlphenylmethanetriisocyanate or the like and, as the component to be reacted with the isocyanate component, ethyleneglycol, propyleneglycol, triethyleneglycol. tetraethyleneglycol, glycerol, hexanetriol, xylylenediol, rauric acid monoglyceride, stearic acid monoglyceride, oleic acid monoglyceride, polyethyleneglycol, polypropyleneglycol, polyester, polyamide or the like.

Some examples of the hot melt adhesives which may be used in the present invention include vinyl acetate resin, polyethylene, vinyl acetate-ethylene copolymer, butylmethacrylic acid, polyisobutylene, polypropylene, polyamide resins, polyester resins, polystyrene, ethylcellulose, petroleum resin, and ethylene-acrylic ester copolymers.

Some examples of the elastomer adhesives which may be used in the present invention include mixtures of polychloropropylene, butadiene-styrene copolymer, butadiene-acrylonitrile copolymer, isobutylene-isoprene copolymer, butadiene-vinylpyridine copolymer, natural rubbers or the like with curing agents and additives. Some examples of the curing agents and additives which may be used in the present invention include sulfur, benzothiazolyl disulfide, phenolic resins, magnesium oxide, zinc oxide, salicylic acid, stearic acid, and diethyldithiocarbamate.

Among the ferroelectric liquid crystal compositions of the present invention, the preferred are those comprising (A) a ferroelectric liquid crystal material selected from the group consisting of ferroelectric polymeric liquid crystals, ferroelectric low molecular weight liquid crystals, and mixtures thereof and (B) a non-liquid-crystalline polymeric material selected from the group consisting of thermoplastic resins, resins having crosslinking ability, and mixtures thereof. In case where a mixture of ferroelectric polymeric liquid crystals and ferroelectric low molecular weight liquid crystals is used as the ferroelectric liquid crystal material, it is preferable that the ferroelectric liquid crystal material contains from 3 to 90 mol %, more preferably 10 to 80 mol of ferroelectric polymeric liquid crystals.

The ferroelectric liquid crystal composition of the present invention preferably comprises from 40 to 97% by weight of the (A) ferroelectric liquid crystal material and from 3 to 60% by weight of the (B) non-liquid-crystalline polymeric material, more preferably from 50 to 90% by weight of ferroelectric liquid crystal material and from 10 to 50% by weight of non-liquid-crystalline polymeric material.

If the amount of the ferroelectric liquid crystal material ls too small, the percent transmission of light may sometimes reduced after production of a liquid crystal optical device, or the degree of orientation by the following orienting treatment may sometimes become insufficient resulting in poor contrast. On the other hand, if the amount of the ferroelectric liquid crystal material is too large, the formability of the ferroelectric liquid crystal composition into film may sometimes deteriorated and insufficient filling of the space between the upper and lower substrates by the aid of the non-liquid-crystalline polymeric material may sometimes occur, resulting in a decrease of the dynamic stability of devices.

In case where resins having crosslinking ability are used as the non-liquid-crystalline polymeric material, the ferroelectric liquid crystal composition preferably contains from 3 to 50% by weight, more preferably from 3 to 40% by weight of resins having crosslinking ability. In case where thermoplastic resins are used as the non-liquid-crystalline polymeric material, the ferroelectric liquid crystal composition preferably contains from 10 to 60% by weight, more preferably from 15 to 50% by weight of thermoplastic resins. In case where mixtures of thermoplastic resins and resins having crosslinking ability are used as the non-liquid-crystalline polymeric material, the preferred amount of the mixtures in the composition is from 3 to 60% by weight, more preferably from 10 to 50% by weight.

In case where the above-described combinations are employed and the ferroelectric liquid crystal material comprises only ferroelectric low molecular weight liquid crystals, the ferroelectric liquid crystal composition preferably contains from 10 to 60% by weight, more preferably from 15 to 50% by weight of the non-liquid-crystalline polymeric material. In case where mixtures of ferroelectric low molecular weight liquid crystals and ferroelectric polymeric liquid crystals are used as the ferroelectric liquid crystal material, the ferroelectric liquid crystal composition preferably contains from 3 to 60% by weight, more preferably from 20 to 60% by weight of the non-liquid-crystalline polymeric material. For example, in case where thermoplastic resins are used as the non-liquid-crystalline polymeric material, the ferroelectric liquid crystal composition preferably contains from 50 to 97% by weight, more preferably from 60 to 97% by weight of a mixture of ferroelectric polymeric liquid crystals and ferroelectric low molecular weight liquid crystals and from 3 to 50% by weight, more preferably 3 to 40% by weight of thermoplastic resins.

On the other hand, in case where the ferroelectric liquid crystal material comprises only ferroelectric polymeric liquid crystals, it is sufficient to use the non-liquid-crystalline polymeric material in an amount of from 3 to 40% by weight, more preferably from 10 to 35% by weight, based on the whole amount of the ferroelectric liquid crystal composition.

Additionally, when mixtures of thermoplastic resins and resins having crosslinking ability are used as the non-liquid-crystalline polymeric material, the non-liquid-crystalline polymeric material preferably contains 50% by weight or more of resins having crosslinking ability.

The method of mixing the ferroelectric liquid crystal material and the non-liquid-crystalline polymeric material is not particularly limited so far as the method permits the formation of capsules of liquid crystal part, and some examples of the method include the following simple mixing method and solution mixing method.

Simple mixing method is a method of kneading the ferroelectric liquid crystal material and the non-liquid-crystalline polymeric material at room temperature or in a range of temperature in which liquid crystals used have small viscosity (i.e. temperatures at which the liquid crystals used do not exhibit crystal phase nor glass phase but exhibit chiral smectic C phase (SmC*), smectic A phase (SmA), nematic phase (N), isotropic phase (Iso) or a coexisted phase thereof). The preferred degree of kneading is such that capsules of liquid crystal part of not more than several tens μm in size can be formed, but a kneading providing a mixture homogeneous under visual observation will suffice practical demands. In case where resins having crosslinking ability are used as the non-liquid-crystalline polymeric material, the resins not yet crosslinked should be kneaded.

Solution mixing method is a method of mixing the ferroelectric liquid crystal material and the non-liquid-crystalline polymeric material after dissolving them in an appropriate solvent. As the solvent, various kinds of solvents can be used, for example methylene chloride, chloroform, toluene, xylene, tetrahydrofuran, methyl ethyl ketone, dimethylacetamide, and dimethylformamide. A uniformly dispersed mixture can be obtained by evaporating the solvent and, further, the size of capsules of liquid crystal can be varied by controlling the rate of evaporation. In the solution mixing method, in case where resins having crosslinking ability are used as the non-liquid-crystalline polymeric material, resins not yet crosslinked should be mixed.

Further, the ferroelectric liquid crystal composition of the present invention may contain coloring matters for liquid crystal display. The preferred amount of coloring matters in the ferroelectric liquid crystal composition is from 0.1 to 3% by weight.

The coloring matters for liquid crystal display which may be used for the ferroelectric liquid crystal composition of the present invention are those of styryl-type, azomethine-type, azo-type, naphthoquinone-type, anthraquinone-type, merocyanine-type, benzoquinone-type, and tetrazine-type. The preferred are azo-type and anthraquinone-type coloring matters.

An example of the styryl-type coloring matters is 4-[β-(6′-nitro-2′-benzothiazolyl)vinyl]-N,N-dimethylaniline.

An example of the azomethine-type coloring matters is 2-[(4-dimethylamino)benzylideneamino]benzothioazole.

Examples of the azo-type coloring matters include azobenzene, 4-nitroazobenzene, 4-dimethylaminoazobenzene,
4-dimethylamino-2′-methylazobenzene,
4-dimethylamino-2-methyl-4′-nitroazobenzene,
4-dimethylamino-3-methyl-4′-nitroazobenzene,
4-dimethylamino-2′-chloro-4′-nitroazobenzene,
4-dimethylamino-2′, 4′-dinitroazobenzene,
4-dimethylamino-2′, 5′-dichloro-4′-nitroazobenzene,
4-dimethylamino-2′,6′-dichloro-4′-nitroazobenzene,
4-diethylamino-4′-nitroazobenzene,
4-(5′-nitro-2′-thiazolylazo)-N,N-dimethylaniline,
4-(6′-ethoxy-2′-benzothiazolylazo)-N,N-dimethylaniline,
4-(6′-nitro-2′-benzothiazolylazo)-N,N-diethylaniline,
9-phenylazojulolidine,
4-[N-(4-ethoxybenzylideneamino)phenylazo]-1-[N-(4-ethoxybenzylidene)]naphthylamine,
4-phenylazo-4′-(1-pyrolidinyl)azobenzene,
4-(2-benzothiazolylazo)-4′-N,N-diethylaminoazobenzene,
4-(6-ethoxy-2-benzothiazolylazo)-4′-N,N-dimethylaminoazobenzene,
4-(6-ethoxy-2-benzothiazolylazo)-4′-N,N-diethylaminoazobenzene,
4-(6-nitro-2-benzothiazolylazo)-4′-N,N-diethylaminoazobenzene,
4-(6-n-butylsulfonyl-2-benzothiazolylazo)-4′-N,N-diethylaminoazobenzene, trisazobenzene,
4,4′-bis(2-hydroxy-1-naphthylazo)azobenzene,
4,4′-bis(p-dimethylaminophenylazo)-2,2′-dichloroazobenzene, and
4,4′-bis(9-julolidinylazo)azobenzene.

Some examples of the naphthoquinone-type coloring matters include 3-butylamino-2-cyano-5-amino-8-hydroxy-1,4-naphthoquinone and 3,8-bis(butylamino)-2-cyano-5-amino-1,4-naphthoquinone.

Some examples of the anthraquinone-type coloring matters include
1-hydroxy-4-(4′-methylphenylamino)anthraquinone,
1-aminoanthraquinone,
1-amino-4-methylaminoanthraquinone,
1-amino-4-phenylaminoanthraquinone,
1,4-diaminoanthraquinone,
1,4-diaminoanthraquinone-(N-n-butyl)-2,3-dicarboxyimide,
1,4-diaminoanthraquinone-(N-n-hexyl)-2,3-dicarboxylmide,
1,4-diaminoanthraquinone-(N-n-butyl)-3′-imino-2,3-dicarboxyimide,
1,4-diaminoanthraquinone-(N-n-hexyl)-3′-imino-2,3-dicarboxyimide,
1,4-diaminoanthraquinone-(N-n-hexyl)-3′-thioxo-2,3-dicarboxyimide,
1,4-diaminoanthraquinone-(N-n-octyl)-3′-thioxo-2,3-dicarboxylmide,
1,5-diaminoanthraquinone,
1,4,5-triaminoanthraquinone,
1,4,5,8-tetraminoanthraquinone,
1,4-bis(methylamino)anthraquinone,
1,4-bis(phenylamino)anthraquinone,
1,4-bis(4′-t-butylphenylamino)anthraquinone,
1,5-bis(phenylamino)anthraquinone,
1,5-bis(4′-methylphenylamino)anthraquinone,
1,5-bis(4′-hydroxyphenylamino)anthraquinone,
1,5-bis(4′-ethylphenylamino)anthraquinone,
1,5-bis(4′-methoxyphenylamino)anthraquinone,
1,5-bis(4′-n-propylphenylamino)anthraquinone,
1,5-bis(4′-isopropylphenylamino)anthraquinone, 1,5-bis(4'-dimethylaminophenylamino)anthraquinone,
1,5-bis(4'-ethoxyphenylamino)anthraquinone,
1,5-bis(4'-n-butylphenylamino)anthraquinone,
1,5-bis(4'-n-propoxyphenylamino)anthraquinone,
1,5-bis(4'-n-pentylphenylamino)anthraquinone,
1,5-bis(4'-n-butoxyphenylamino)anthraquinone,
1,5-bis(4'-molpholinophenylamino)anthraquinone,
1,5-bis(4'-n-pentyloxyphenylamino)anthraquinone,
1,5-bis[4'-(N-ethyl-N-β-hydroxyethyl)phenylamino]anthraquinone,
1,5-bis(4'-phenoxyphenylamino)anthraquinone,
1,5-bis(4'-hexyloxyphenylamino)anthraquinone,
1,5-bis[4'-(phenylazo)phenylamino]anthraquinone,
1,5-bis(4'-n-heptyloxyphenylamino)anthraquinone,
1,5-bis(4'-n-octyloxyphenylamino)anthraquinone,
1,5-bis(4'-nonyloxyphenylamino)anthraquinone, and
1,5-bis(4'-n-decyloxyphenylamino)anthraquinone.

An example of the merocyanine-type coloring matters is 3-ethyl-5-[4-(3-ethyl-2-benzothiazolylidene)-2-hexenylidene]rhodanine.

An example of the benzoquinone-type coloring matters is 2,5-di(4-heptyloxyphenyl)-3,6-dichtorobenzoquinone.

Some examples of tetrazine-type coloring matters include
6-(4-pentyloxyphenyl)-3-(4-pentylpiperidine-1-yl)-1,2,4,5-tetrazine,
3-(p-buthoxyphenyl)-6-(4'-n-pentylcyclohexyl)-1,2,4,5-tetrazine.
3-(trans-4-propylcyclohexyl)-6-(4-trans-4'-butylcyclohexylphenyl)-1,2,4,5-tetrazine, and
3-n-hexyl-6-(4-n-butoxyphenyl)-1,2,4,5-tetrazine.

The electrode layers to be used in the present invention may be of common kinds, for example, conductive inorganic films such as a metal film and a film of a conductive oxide, a conductive organic film or the like.

In the present invention, it is generally preferable to use a transparent or semitransparent electrode layer as at least one of the two electrode layers and to provide the transparent or semitransparent electrode layer to a transparent substrate.

Some illustrative examples of the transparent or semitransparent electrode layer include tin oxide film called NESA, indium oxide containing tin oxide, which is called ITO (Indium-Tin oxide), deposition layers of gold, titanium. etc., and thin layers of metals or alloys. These electrode layers may be provided to the prescribed surfaces of substrates or liquid crystal layer by means of various techniques including known techniques, for example, spattering technique, evaporation technique, printing technique, application technique, gilding technique, adhering technique or a combination technique thereof.

There is no particular restriction in the form of the electrode layers to be used in the present invention, and they may cover the whole surfaces of the prescribed subjects such as the substrates, or may have a pattern of stripes or any other pattern desired.

The substrates to be used in the present invention may be made of various kinds of materials. From the standpoints of productivity, wide use, processability, etc., it is preferable to use flexible substrates made of a plastic or the like which excels in strength, heat resistance, transparency, and durability.

Some illustrative examples of the flexible plastic include crystalline polymers such as uniaxially stretched or biaxially stretched polyethyleneterephthalate, non-crystalline polymers such as polysulfones and polyethersulfones, polyolefins such as polyethylene and polypropylene, polycarbonates, and polyamides such as nylons.

Among these, the particularly preferred are uniaxially stretched polyethyleneterephthalate, polyethersulfones, and polycarbonates.

In the present invention, the two substrates of a liquid crystal optical device may be made of the same material, or each substrate may be made of a material different from that of the other. Generally, at least one of the two substrates used is optically transparent and is provided with a transparent electrode layer.

There is no particular restriction in the form of the substrates to be used in the present invention, and the forms of the substrate to be used may vary depending on the purpose of use, etc. Generally, substrates of plate-form, sheet-form or roll film-form are preferably used in the present invention, and it is particularly preferable to use roll film-form substrates to take advantage of their fitness to continuous production system.

The thickness of the substrates may be selected according to the qualities of the substrates such as the degrees of transparency, flexibility, strength, and processability, the purpose of use of the produced devices, etc. and it is generally from about 20 to about 1000 μm.

The liquid crystal optical devices of the present invention can be produced by a method of laminating electrodes or substrates carrying electrode layer and a film of the ferroelectric liquid crystal composition of the present Invention or by a method comprising forming a layer of the ferroelectric liquid crystal composition of the present invention, by application or the like, on a electrode film or a substrate carrying electrode layer, and then laminating another electrode or another substrate carrying electrode layer on the obtained layer.

In the former method, a film of the ferroelectric liquid crystal composition of from 0.5 to 10 μm, preferable from 0.5 to 4 μm thickness is formed by employing a film forming technique commonly employed for ordinary polymers, such as casting technique, extrusion technique, or press technique, and supporting the both sides of the film by two electrodes of which at least one is a transparent electrode, to produce a liquid crystal optical device. The obtained device may be provided with a transparent substrate on its one or both surfaces. In this method, the film of ferroelectric liquid crystal composition may be formed rather thick (from 1 to 50 μm) to be uniaxially stretched approximately two to five times before lamination with electrodes. In such a method, forming of film can serve as well orientation of the ferroelectric liquid crystal material.

The latter method is a method of forming a layer of the ferroelectric liquid crystal composition, by application, on the electrode layer of a substrate carrying electrode layer and then laminating an opposite electrode or substrate carrying electrode layer on the layer of the ferroelectric liquid crystal composition. If the application temperature and application speed are properly selected, the film formation method by application will make it possible to directly orient the ferroelectric liquid crystal material using a bar coater or the like. Further, this method is suitable for the present invention since it is advantageous in that the range of the desirable operation condition is wide, the thickness of the film can be widely varied, and so on.

Application of the ferroelectric liquid crystal composition is usually carried out by placing a ferroelectric liquid crystal composition on an electrode layer and then forming the composition into a layer by using an application means, such as a cylindrical roller or a spatulate bar, to spread the composition. In addition, other various kinds of application methods including heating application, solution application, water-surface application using bar coater, direct gravure roll technique, micro gravure technique, etc. may also be employed. Among these, in the present invention, it is preferable to employ solution application method in which a 5 to 50% by weight solution of a ferroelectric liquid crystal composition is applied on a substrate carrying electrode layer using roll coater, gravure coater, screen printing method or the like, and after the solvent is evaporated, an opposite electrode or substrate carrying electrode layer is then laminated on the obtained layer of the ferroelectric liquid crystal composition.

The preferred thickness of the film of the ferroelectric liquid crystal composition in a liquid crystal optical device is usually from 0.5 to 10 μm, more preferably from 0.5 to 4 μm.

Figure 2:
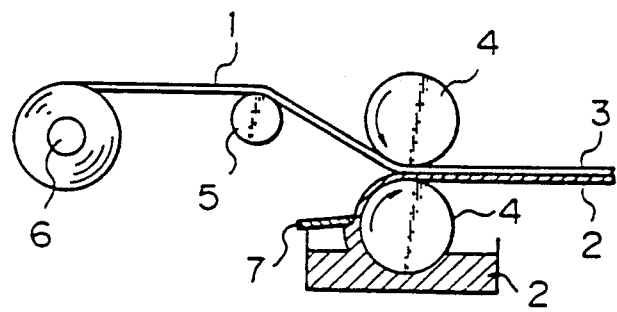
FIG. 2 is a schematic view illustrating an example of the method of forming a layer of a ferroelectric liquid crystal composition by application which may be suitably employed as the pre-step previous to the orienting step and the supporting step by laminating, etc. in the method according to the present invention.

FIG. 2 is a schematic view illustrating a method of forming a layer of ferroelectric liquid crystal composition by application, which method can be suitably employed as the pre-step previous to the orientation step and supporting step by lamination etc. in the production of liquid crystal optical devices according to the present invention.

In FIG. 2, the referential numeral 1 represents a flexible substrate carrying electrode layer, the referential numeral 2 represents a ferroelectric liquid crystal composition or a solution thereof, the referential numeral 3 represents a coated substrate consisting of the flexible substrate carrying electrode layer 1 and the ferroelectric liquid crystal composition or a solution thereof 2 applied thereon, the referential numeral 4 represents a roll coater, the referential numeral 5 represents a guide roll, the referential numeral 6 represents a supply roll, and the referential numeral 7 represents a doctor knife for scraping.

When a thin layer of ferroelectric liquid crystal composition is desired, the continuity between the substrates may be prevented by providing an insulating spacer made of, for example, silicon oxide or an insulating plastic, between the substrates in the film-forming step or the supporting step, or by previously providing a thin insulating layer of a polymer, etc. between the substrate and the smectic liquid crystal layer by application method or the like.

The thickness of the insulating layer is not particularly limited and the preferred thickness is generally not more than 1 μm, preferably not more than 0.5 μm.

As the method of supporting the ferroelectric liquid crystal composition by laminating an opposite substrate on the layer of ferroelectric liquid crystal composition formed by application, for example, usual lamination technique using pressure roller, etc. may be suitably employed.

In FIG. 1, the simplest example of the lamination technique using pressure roller is shown.

In FIG. 1, the referential numeral 8 represents a pair of pressure rollers, the referential numeral 3 represents a flexible substrate carrying electrode layer applied with a ferroelectric liquid crystal composition 2, and the referential numeral 1' represents an opposite flexible substrate carrying electrode layer.

As the continuous and high-speed mass production method for producing the liquid crystal optical device of the present invention, it is particularly suitable to employ a method wherein a layer of a ferroelectric liquid crystal composition is formed by continuously applying the composition on a flexible plastic substrate bearing substrate by using the above-described application technique or the like, during moving the substrate at a high speed and then, an opposite plastic substrate carrying electrode layer is layered on the layer of the ferroelectric liquid crystal composition and continuously laminated.

In the liquid crystal optical device of the present invention, the ferroelectric liquid crystal material should have been uniaxially oriented. That is, in order to attain high contrast by switching electric field, the liquid crystal optical device should be made into birefringence type. Therefore, the ferroelectric liquid crystal material should be uniaxially oriented approximately in parallel to the cell plane.

The orienting treatment may be conducted at the time of formation of film or after formation of film and lamination.

In case where orienting treatment is conducted in the step of forming film, lamination should be conducted after stretching the formed film. An oriented state can be obtained by stretching the film by 2 to 5 times at a temperature at which the ferroelectric liquid crystal material exhibits SmC* phase, SmA phase, N phase, N* phase, or a coexisted phase of one of these phases and isotropic phase (Iso phase). When the obtained orientation state is insufficient, the orientation state can be improved by heating the film to its isotropic phase temperature and then cooling it to its liquid crystal temperature by from 0.05 to 20 K/min, preferably from 0.05 to 5 K/min. In case of a layer formed by application, an orientation state can be obtained at the time of application by appropriately setting the application conditions.

As the method of conducting orienting treatment after film formation and lamination, rubbing technique, SiO oblique evaporation technique, shear technique, orientation by bending treatment or the like can be employed.

In case of employing rubbing technique, an oriented liquid crystal layer can be obtained by previously forming a layer of polyimide (PI), polyvinylalcohol (PVA), etc. of from 20 to 10,000 Å, preferably not more than 2,000 Å in thickness, by spin coating technique, dipping technique, application technique or the like, on at least one of the substrates carrying electrode layer for supporting liquid crystal, and rubbing the obtained layer with clothes or the like, and then, after supporting a ferroelectric liquid crystal composition, cooling the liquid crystal composition from its isotropic phase by from 0.05 to 20 K/min, preferably from 0.05 to 5 K/min (Rubbing Technique: Masato Isogai, Teruo Mukoh, Fumio Nakano, Mikio Sato; Collected Papers for the lectures for the forty third symposium of the Applied-Physical Society (the autumn of 1982).

In case of employing SiO oblique evaporation technique, an oriented liquid crystal layer can be obtained by previous sio oblique evaporation of an inorganic material such as SiO, $SiO_2$ or the like on at least one substrate carrying electrode layer and then cooling the liquid crystal layer from its isotropic phase by the same speed as that of rubbing technique (W. Urbach, M. Boix, and B. Guyon; Appl. Phys. Lett., 25 (1974) 479).

In case of employing shear technique, an oriented liquid crystal layer can be obtained by slightly sliding the upper and lower substrates carrying electrode layer from each other to apply a shear stress to the liquid crystal (N. A. Clark and S. T. Langerwall; Appl. Phys. Lett., 36 (1980) 899).

The particularly preferred method of orienting the ferroelectric liquid crystal composition of the present invention is to orient the ferroelectric liquid crystals in a liquid crystal optical device produced as described above by subjecting the liquid crystal optical device yet to be oriented to a bending treatment in a specified bending direction. Since the ferroelectric liquid crystal composition of the present invention comprises ferroelectric liquid crystal material and polymeric material and therefore, has a small macro-modulus of elasticity in its multi-domain state, a sufficient oriented state can be attained merely by bending.

Figure 3A:
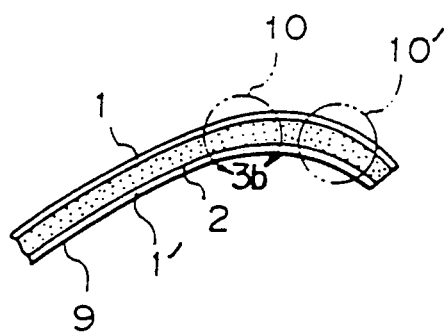
FIGS. 3a and 3b are schematic views illustrating an example of the distribution of shear stress applied by bending treatment to the bent portion of a ferroelectric liquid crystal composition in a liquid crystal optical device.
Figure 3B:
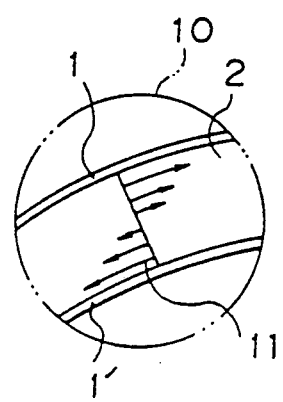

It can be presumed that the high orientation attained by the bending treatment is attributable to the very small shear stress shown in FIG. 3a and 3b which is caused by the bending action and applied to the part of the ferroelectric liquid crystal neighboring the part subjected to the bending treatment.

FIGS. 3a and 3b are schematic views illustrating the distribution of the shear stress applied by a bending treatment to the bending treated portion of a ferroelectric liquid crystal in a liquid crystal optical device, wherein the FIG. 3(a) is a schematic view showing an example where a liquid crystal optical device 9 is being subjected to a bending treatment, and each of the referential numerals 1 and 1' represents a flexible substrate carrying electrode layer, the referential numeral 2 represents a ferroelectric liquid crystal composition, and the referential numeral 10' represents the part of the liquid crystal optical device 9 being subjected to a bending treatment, and the FIG. 3(b) is a partially enlarged view of the portion subjected to a bending treatment, wherein arrows show the distribution of the shear stress applied to the ferroelectric liquid crystal composition by the bending treatment.

Since the ferroelectric liquid crystal composition of The present invention have a larger modulus of elasticity than nematic liquid crystals, bending treatment is apt to cause a deformation due to slip between the contacting domain units rather than a uniform deformation. Therefore, the orientation direction of domains, i.e. the orientation direction of liquid crystal molecules is at right angles to the shear direction.

Figure 4:
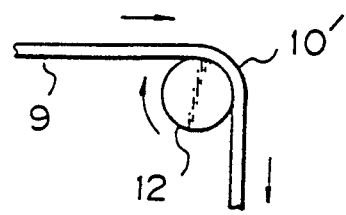
FIG. 4 is a schematic view illustrating an embodiment of the orienting method by bending treatment according to the present invention.

FIG. 4 is a schematic view illustrating an embodiment of the orientating method used in the present invention, wherein a liquid crystal optical device 9 is subjected to a bending treatment using one roll 12 in the course of continuous move of the liquid crystal optical device 9.

In FIG. 4, the referential numeral 10' represents the part of the liquid crystal optical device 9 being subjected to the bending treatment.

In the bending treatment employed in the present invention, it is important to conduct the bending treatment with the bending direction of the bending treatment adjusted so that the bending direction and the optically principal axis (orientation direction) of at least one of the substrates approximately make, on the plane of the substrate, the tilt angle θ of the ferroelectric liquid crystal composition or 90°−θ, or with the bending direction adjusted so that bending direction and the longitudinal direction of the substrates approximately make, on the planes of the substrates, the tilt angle θ of the ferroelectric liquid crystal composition or 90°−θ. Herein, the bending direction refers to a direction of a line bounding two planes formed on a surface of a substrate at the time of bending the substrate.

For example, when substrates having optical anisotropy, such as uniaxially or biaxially stretched PET, are used, it is preferable to conduct the bending treatment with the bending direction adjusted so that the bending direction and the optically principal axis of the substrates approximately make, on the planes of the substrates, the tilt angle θ of the ferroelectric liquid crystal composition or 9−θ.

Figure 5:
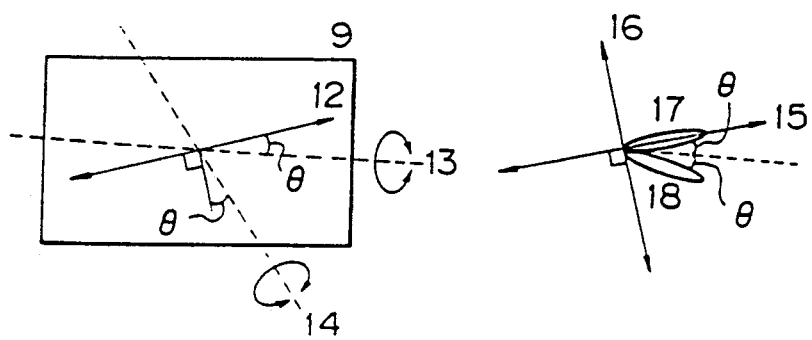
FIG. 5 is an explanatory view illustrating, with regard to the orienting method by bending treatment according to the present invention, the relation between the bending direction and polarizers.

FIG. 5 illustrates the relation between the bending direction at the time of benging a liquid crystal device and a polarizer. The referential numeral 9 represents a liquid crystal optical device enclosing a ferroelectric liquid crystal composition therein, the referential numeral 12 represents the optically principal axis of substrate, each of the referential numerals 13 and 14 represents a bending direction of the device, each of the referential numerals 15 and 16 represents the polarizing axis of the polarizer, the referential numeral 17 represents the orientation direction of a liquid crystal (darkness) at the time when an electric field is applied in a certain direction, and the referential numeral 18 represents the orientation direction the liquid crystal (light) at the time an electric field is applied in a direction opposite to 17.

For example, a bending treatment along the bending direction 13 makes domains of liquid crystals orient in a direction parallel with the dotted line Thus oriented device can be switched between light and dark states by arranging two polarizers outside the device 9 so that their polarizing axes 15 and 16 approximately make the tilt angle θ or 90°−θ and perpendicularly intersect with each other and, subsequently, switching the orientation direction of the liquid crystal between 17 and 18 by switching the electric field between positive and negative. Of course, the two polarizers may also be arranged with both of their polarizing axes directed in one direction 15 or 16 To be parallel to each other. In the latter case, the switching between light and darkness will be reversed.

Further, blending dichroic coloring matters into the ferroelectric liquid crystal composition enables operation in known guest-host-mode and requires only one polarizer. In this case, the polarizer is generally arranged so that its polarizing axis and the orientation direction of liquid crystal composition make the tilt angle θ.

Although it is preferable to adjust accurately each of the angles described above such as θ (or 90°−θ), i.e. the relation between the bending direction and the tilt angle. The relation between polarizers and the orientation direction of liquid crystal composition, etc., errors not more than 10° are allowable. To obtain a high contrast, it is preferable to keep the errors not more than 5°.

The orientation by means of bending treatment can be more effectively performed by heating the liquid crystal optical device to a proper temperature depending on the kinds of the liquid crystals used.

In the orienting method of the present invention by bending treatment, It is generally preferable to conduct the bending treatment within a temperature range in which the ferroelectric liquid crystal composition exhibits a coexisted phase of isotropic phase and smectic A phase, a coexisted phase of isotropic phase and chiral smectic C phase, smectic A phase or chiral smectic C phase or the liquid crystal optical device is subjected to a bending treatment while cooling the liquid crystal optical device from a temperature at which the ferroelectric liquid crystal composition exhibits isotropic phase, a coexisted phase of isotropic phase and smectic A phase or a coexisted phase of isotropic phase and chiral smectic C phase to a temperature at which the ferroelectric liquid crystal composition exhibits smectic A phase or chiral smectic C phase.

In order to attain a uniform orientation in the whole liquid crystal cell, it is preferable to conduct the bending treatment in the course of continuous move of the liquid crystal optical device yet to be oriented.

In the orienting method employed in the present invention, the above-described orientation by bending treatment can be conducted by using various kinds of apparatuses and systems. It is generally suitable to use a bending treatment using at least one free rotation roll in the course of continuous move of the liquid crystal optical device yet to be oriented, preferably a method of subjecting a liquid crystal optical device yet to be oriented to a bending treatment in the course of continuous move of the liquid crystal optical device moving through at least two free rotation rolls.

Hereinafter, the orientation by bending treatment employed in the present invention will be described in more details.

In the orienting method employed in tile present invention, it is preferable to conduct the bending treatment with the bending degree of the liquid crystal optical device adjusted within generally from 5 to 1,000 mm, preferably from 10 to 500 mm, as measured as the radius of curvature.

Too small radius of curvature is apt to damage substrates or to cut electrode layers delicate in pattern and, on the other hand, if the radius of curvature is too large, the shear stress applied on the liquid crystal may become insufficient resulting in a poor orientation state.

In the orienting method employed in the present invention, orientation of ferroelectric liquid crystals by means of the above-described bending treatment can be performed more effectively and more efficiently by subjecting a liquid crystal optical device to the bending treatment in the course of continuous move of the liquid crystal optical device. Particularly, it can be performed furthermore effectively at a high speed, enabling mass production, by continuously moving the liquid crystal optical device yet to be oriented through at least two free rotation rolls to subject the liquid crystal optical device yet to be oriented to bending treatment.

The moving speed of the liquid crystal optical device during the bending treatment cannot be uniformly defined because it varies depending on the radius of curvature at the bending part, temperature, the kinds of the ferroelectric liquid crystals used, etc. It is generally sufficient to adjust the speed to the line speed of a continuous production process including a step of film-forming by application and a step of lamination treatment. Therefore, it is possible to equalize all of the line speeds in various steps including the orientation step by bending treatment, whereby a continuous, high-speed process for mass producing liquid crystal optical devices can be efficiently realized, resulting in an extreme improvement of mass productivity.

In the above-described continuous, high-speed mass production process, the suitable moving speed of the liquid crystal optical device during the bending treatment ranges generally from 0.1 to 50 m/min. (from 0.16 to 83.3 cm/sec.).

The above-described preferred moving speed of the liquid crystal optical device during bending treatment has been established mainly considering the condition in application operation.

Therefore, there is no particular limit in the moving speed suitable only for bending treatment, and the range can be larger than the above-described range. However, if the moving speed is too high, some kinds of substrates may suffer a damage, such as cracking, during the bending treatment, and on the other hand, if it is too low, although a sufficient orientation will be attained the production time will be elongated resulting in a decrease of practicality.

In the above-described orienting treatment by bending treatment, accurate adjustment of temperature is not necessarily required. In order to attain extremely good orientation at widely ranging line speeds (line speed: a speed corresponding to the winding speed of product), particularly at a very high line speed, it is preferable to conduct the bending treatment while cooling the ferroelectric liquid crystal composition from a temperature at which it exhibits isotropic phase, a coexisted phase of isotropic phase or smectic A phase or a coexisted phase of isotropic phase and chiral smectic C phase to a temperature at which it exhibits smectic A phase or chiral smectic C phase.

Hereinafter, an embodiment of the orienting method wherein orienting treatment is performed by conducting bending treatment while cooling a liquid crystal optical device from an isotropic phase temperature to a liquid crystal phase temperature, referring to drawings.

Figure 6:
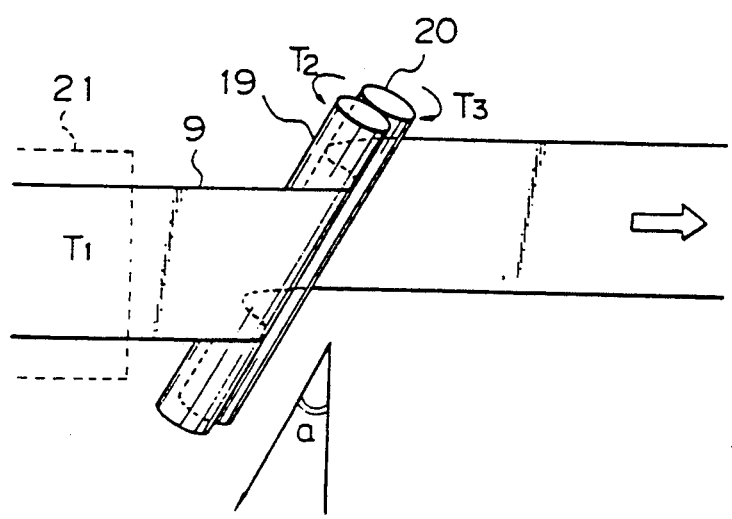
FIG. 6 is a view Illustrating an embodiment of the orienting method according to the present invention.

FIG. 6 is a schematic view illustrating a particularly preferable embodiment of the above-described continuous orienting method to be employed in the present invention wherein bending treatment is conducted with the bending direction inclining at an angle, while cooling the temperature from an isotropic phase temperature to a liquid crystal phase temperature.

In FIG. 6, the referential numeral 9 represents a liquid crystal optical device, each of the referential numerals 19 and 20 represents a free rotation roll, the referential numeral 21 represents a heating apparatus, the referential numerals $T_1$, $T_2$, and $T_3$ respectively represent the temperatures of the heating apparatus 21, the free rotation roll 19, and the free rotation roll 20.

In the orienting method shown in FIG. 6, in the course of continuous move of the liquid crystal optical device 9, the liquid crystal optical device 9 is heated to a temperature at which the ferroelectric liquid crystal composition in the liquid crystal optical device exhibits isotropic phase by the heating apparatus 21 adjusted to a temperature $T_1$, and then the liquid crystal optical device 9 is moved through the two free rotation rolls 19 and 20 adjusted to temperatures $T_2$ and $T_3$ respectively, while cooling the ferroelectric liquid crystal composition to a temperature at which it exhibits a liquid crystal phase. At the time, the two rolls are arranged so that the angle "a" made between the bending direction of the substrates and the direction right-angled to the principal axis of at least one of the substrates becomes $\theta$ or $90°-\theta$. The number of the rolls is not limited to two but also may be one or three or more. The preferred number is two or more. In the above method, it is sufficient to adjust the temperature $T_1$ so that the liquid crystal optical device 9 can maintain an Isotropic phase temperature until, at least, it begins to be subjected to bending treatment. It is also sufficient to adjust the temperatures $T_2$ and $T_3$ so that before the conclusion of the bending treatment, the liquid crystal optical device 9 can be cooled to a liquid crystal phase temperature.

In the above method, it is generally appropriate to adjust the temperature $T_1$ to a higher temperature than the temperatures $T_2$ and $T_3$.

The temperatures $T_2$ and $T_3$ may be identical with or different from each other. However, in order to make the temperature control easy considering the heat capacity of the liquid crystal optical device, and to maintain stable operation for a long time, it is generally desirable to maintain the temperature $T_3$ lower than the temperature $T_2$.

In the above-described orienting method, there is no particular restriction in the arrangement of the free rotation rolls to be used in the orientation by bending treatment. However, it is particularly preferable to conduct the bending treatment, as the example shown in FIG. 6, by arranging at least two free rotation rolls in sequential order and continuously moving a liquid crystal optical device through these free rotation rolls.

As apparent from the above description, the method of orienting liquid crystal optical device according to the present invention is extremely advantageous in practical used in that a high orientation can be attained by extremely simple procedures without requiring complicated pretreatment of substrates, etc.; liquid crystal optical devices having excellent high speed response property, high contrast ratio, etc. can be obtained in an efficient manner; and a high speed and continuous mass-production system can be easily realized. The orienting method in the present invention is, therefore, suitable for orienting method in a production process of various kinds of ferroelectric liquid crystal optical devices with supporting substrates carrying electrode layers.

Figure 7:
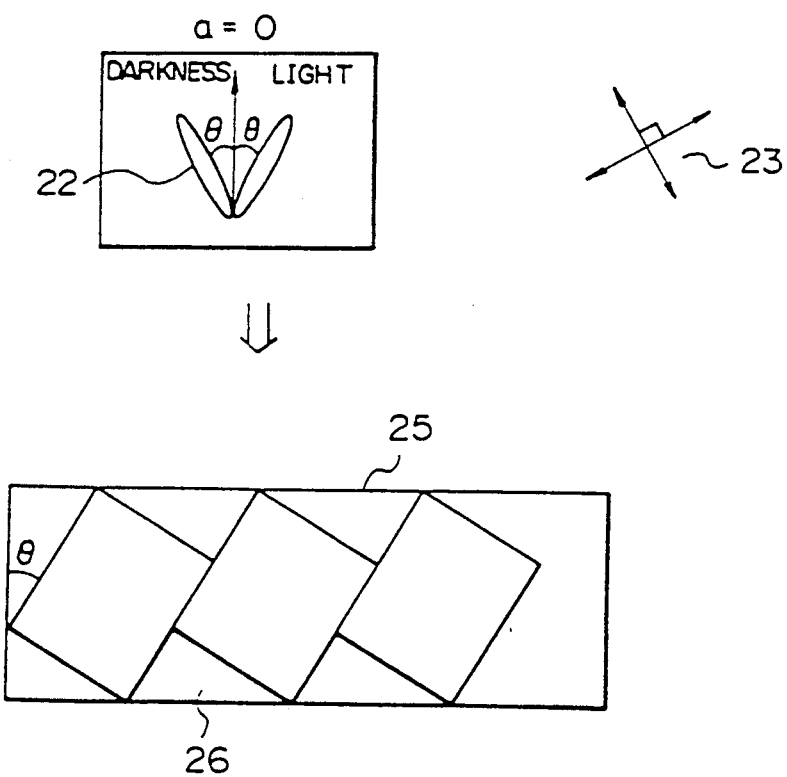
Figure 8:
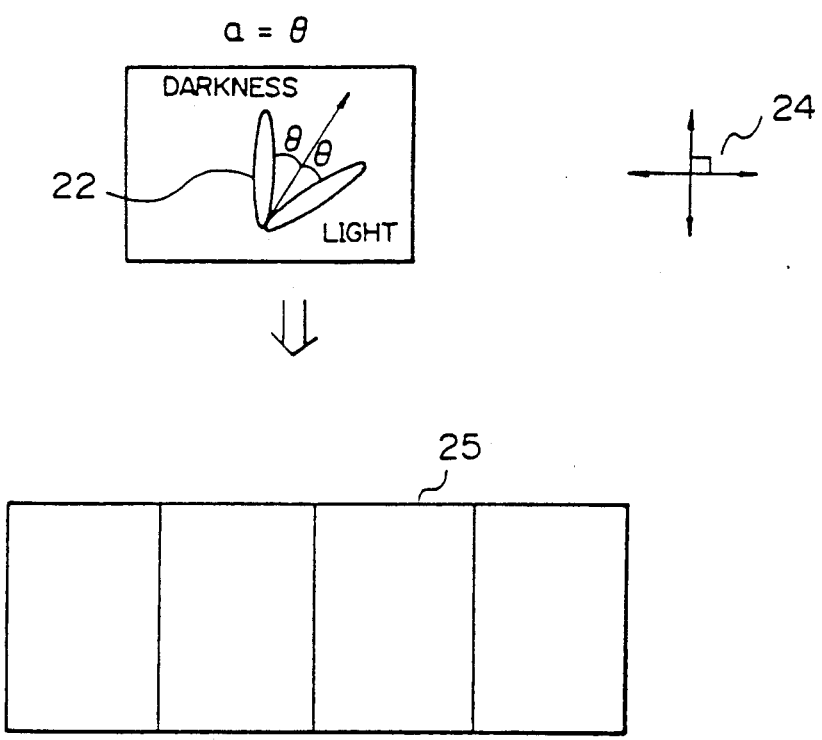
FIG. 8 is an explanatory view showing the inclination of a liquid crystal molecule and the relation between the direction of polarizers and polarizing plate material when a liquid crystal optical device oriented under the condition of $a=0°$ or $a=\theta$ is used as a display device together with polarizers by applying electric fields between the upper and lower electrode layers.

Next, if substrates having no optical anisotropy, such as PES (polyethersulfones), PC (polycarbonates) or PS (polysulfones), is used, it is preferable to conduct bending treatment with the bending direction of the bending treatment adjusted so that the bending direction and the longitudinal direction of the substrates approximately make $\theta$ or $90° - \theta$. Each of FIG. 7 and 8 is a view illustrating respectively the inclination of a liquid crystal molecule 22 and the relation between the direction of polarizers (23, 24) and the polarizing raw-plate 25 when a liquid crystal optical device oriented under a condition of $a = 0°$ or $a = \theta$ is used as a display device together with polarizers, by applying an electric field between the upper and lower electrode layers. The liquid crystal molecule 22 inclines to make with the main axis of the liquid crystal molecule an angle, $+\theta$ or $-\theta$, and exhibits its dark state or light state. When bending treatment has been conducted under the condition of $a = \theta$, the polarizing raw-plate 25 can be used without wasting any portion.

Hereinafter, there will be described crosslinking operation to be carried out when resins having crosslinking ability are used as the non-liquid-crystalline polymeric matter. It is preferable to carry out the above-described orienting treatment before the resins having crosslinking ability are cured sufficiently since insufficient curing is advantageous to applying large shear to the liquid crystal portions and the higher orientation state can be attained.

Crosslinking operation is conducted by mixing a crosslinking agent (hardener) in a resin having crosslinking ability. The mixing may be generally conducted at the time of preparation of a solution of a ferroelectric liquid crystal composition before formation of film. Since the dilution effect of solution state prevent ready crosslinking, the viscosity of the solution does not vary rapidly. After formation of film of ferroelectric liquid crystal composition and evaporation of the solvent used, crosslinking begins. Depending on the kinds of resins having crosslinking ability, there are some resins which can be cured merely by standing it at room temperature (for several minutes to several hours) but can be saved of the curing time by heating to an appropriate temperature or by irradiating ultraviolet light. The heating and irradiation of ultraviolet light may be conducted either before or after lamination and are preferably conducted after lamination and orienting treatment. When a mixture of a ferroelectric liquid crystal composition and a resin having crosslinking ability is used for film formation without using solvent, crosslinking begins at the time of preparing the mixture and therefore, a resin requiring long crosslinking (curing) time may be selected to realize stable, continuous production. In such a case, it is also possible to accelerate curing after formation of film by irradiating ultraviolet light.

Although thus obtained liquid crystal device of the present invention excels in maintaining the film-form of the ferroelectric liquid crystal composition, the edge surfaces of cells may be sealed with an epoxy adhesive or the like when there is possibility of effluent by a long-term use.

Since the ferroelectric liquid crystal composition of the present invention has a good formability into film, liquid crystal optical devices of large area can be produced in the better yield by using the composition. Further, since the method of producing liquid crystal optical device of the present invention enables to make the liquid crystal cell thick, the producing conditions can be relaxed and the fear of continuity failure can be reduced. Therefore, when orienting the ferroelectric liquid crystal material, a high degree of orientation can be attained continuously in high speed by bending treatment which merely requires very simple and easy operation. Further, the liquid crystal optical device obtained by the present invention excels in the fundamental properties of liquid crystal optical devices including high speed response to external stimuli such as electric field and high contrast ratio and as well, have sufficient flexibility and strength. Also, it does not become discolored nor have color shading and excels in bistability and dimensional stability.

EXAMPLES 1 TO 21 AND COMPARATIVE EXAMPLES 1 AND 2

Example 1

The following ferroelectric low molecular weight liquid crystal was used as the ferroelectric liquid crystal material.

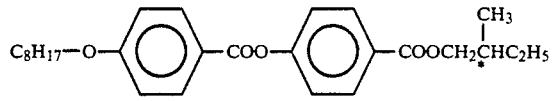

Phase transition behavior

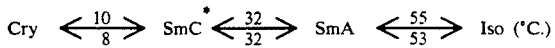

As the resin having crosslinking ability, a commercial rapid cure epoxy resin (CEMEDINE HIGH SUPER produced by Cemedine Co., Ltd., epoxy resin:crosslinking (hardening) agent=1:1 (weight ratio)) was used.

5 g of the liquid crystal and 5 g of the resin were dissolved in 90 g of dichloromethane to prepare a 10% by weight solution of a mixture of 1:1, and the obtained solution was applied on a PES (polyether sulfone) substrate bearing ITO (width: 15 cm, thickness: 125 μm) at room temperature by using a roll coater. After evaporating the solvent, the thickness of the applied layer became 6 μm. Thereafter, the same kind of PES substrate was laminated on the applied layer, and the obtained liquid crystal optical device yet to be oriented was subjected to an orienting treatment by bending treatment at 50° C., to obtain a liquid crystal optical device of 15 cm×200 cm. When voltages of ±20 V were applied to the device placed between crossed polarizers, a contrast ratio of 45 and a response time of 400 μs were measured at 25° C. The retardation value (Δn·d) was 0.28 (Δn: anisotropy in refractive index, d: thickness of cell). The particles of liquid crystal parts (microcapsules) were observed by a microscopic observation to be approximately from 1.5 to 2 μm in their size, and owing to bistability, each state was maintained even after switching the above-described voltages off.

After the resin was cured, the orientation state of liquid crystal was not disturbed by bending (down to the radius of curvature of 5 cm) and continuity failure never occurred even by cutting the device with a cutter or the like.

When operating the liquid crystal optical device between crossed polarizers in birefringence mode, the transmitted light was faintly yellowish white which corresponds to the color of the light transmitted through about 3 μm thick conventional cell produced without using the resin.

The measurement of response time was conducted by supporting a device between two crossed polarizers and measuring the time required of the strength of transmitted light to change from 10% to 90% when the positive sign and negative sign of the applied electric field were reversed.

Example 2

A mixture comprising 10 g of a ferroelectric low molecular weight liquid crystal, DOBAMBC:

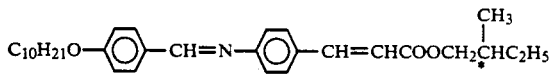

Phase transition behavior

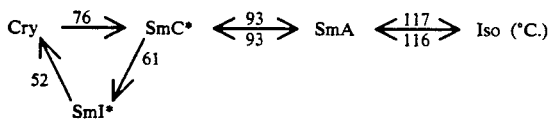

Figure 10:
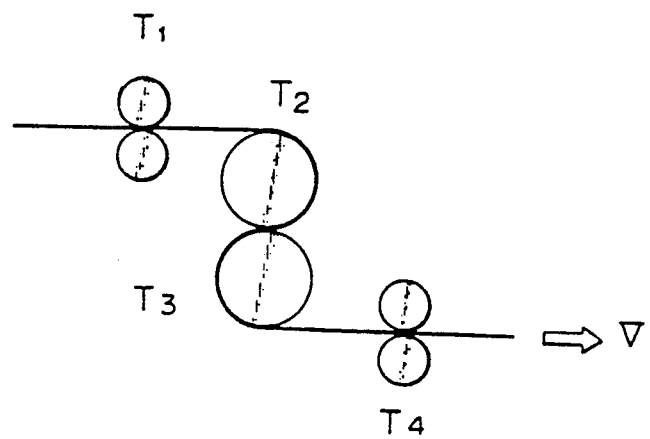
FIG. 10 is a schematic view illustrating a device being oriented by a bending treatment.

(Cry: crystal state SmC*: chiral smectic C phase SmI*: chiral smected I phase, SmA: smectic A phase, Iso: isotropic phase) and 7 g of an epoxy resin (MG-150 produced by Pernox Co., Ltd. epoxy resin:crosslinking agent=1:1 (weight ratio)) was dissolved in chloroform to form a 15% by weight solution. The obtained solution was applied on a PET substrates bearing ITO (thickness: 100 μm) using a rod coater, and after evaporating the solvent, a composite layer of 5 μm thickness was obtained. After laminating an opposite PES substrate bearing ITO (thickness: 125 μm) by using a laminator consisting of a rubber roller and a metal roller, a device of 20 cm×1.5 m was obtained. After the obtained device was subjected to an orienting treatment by bending treatment by using the rolls as shown in FIG. 10 ($T_1=25°$ C., $T_2=125°$ C., $T_3=85°$ C., $T_4=70°$ C., v=3 m/min., diameters of rolls: 80 mm (the larger rolls) and 40 mm (the smaller rolls), a contrast ratio of 57 and a response time of 170 μs were measured at 70° C. The retardation value (Δn·d) was 0.23. The light transmittance changed approximately by 5% at 70° C. in 24 hours after switching off the electric field applied on the device supported between crossed polarizers, and the fact shows sufficient bistability. In common with Example 1, the transmitted light was faintly yellowish white when the device was turned to the light state by switching the applied electric field.

Comparative Example 1

An oriented layer of 5 μm in cell thickness was formed by using liquid crystal (DOBAMBC) alone in place of the mixture used in Example 1, and the same measurements as those in Example 1 were conducted. The contrast ratio was measured to be 38 and, in the estimation of bistability, the light transmittance changed approximately by 25% in 24 hours after switching electric field off. Further, the color of the transmitted light ranged from deep red to deep green showing the occurrence of color shading due to the slight irregularity of thickness.

In order to make the liquid crystal part exhibit the properties of the level as acquired in Example 1, the layer of liquid crystal had to be made thinner to not more than 3.5 μm as to contrast, and about to not more than 2 μm as to coloration.

EXAMPLE 3

The following liquid crystal:

Polyacrylate-type

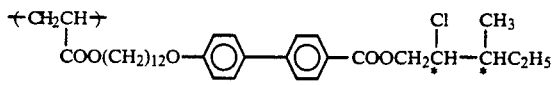

Number average molecular weight Mn = 5,000

Phase transition behavior

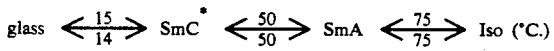

(glass: glass state)

as the ferroelectric polymeric liquid crystal and MG-150 produced by Pernox Co., Ltd. as the resin having crosslinking ability were kneaded in a weight ratio of 3 (liquid crystal):2 (resin) at 90° C. to obtain a mixture. After kneading about for 10 min., the mixture was almost uniformalized according to visual observation.

The mixture was applied quickly on a PES substrate bearing ITO with a gravure coater to form a layer of about 4 μm. The application was conducted at 105° C. Successively, after laminating the same kind of substrate, the obtained laminate was subjected to an orienting treatment by moving it through the rolls as shown in FIG. 10 ($T_1=90°$ C., $T_2=90°$ C., $T_3=42°$ C., $T_4=25°$ C., v=3 mm/min.). All of the above processes were conducted continuously, and a laminated sheet of liquid crystal device of 15 cm in width and 30 m in length was obtained. After allowing the sheet to stand for about 20 hours to cure the resin, a portion of 15 cm×20 cm in size was cut out from the sheet. The contrast ratio of the cut sheet was measured between crossed polarizers to be 88 at 24° C. with applied voltages of ±10 V. The response time was measured to be 60 ms with applied voltages of ±30 V. The retardation value (Δn·d) was 0.25. After switching voltage off, about 100% of the state under electric field was retained for over 48 hours, showing a sufficient histability. The transmitted light was nearly white in the light state, and no color shading was observed. When ten cut sheets were cut out from the laminated sheet of liquid crystal device, all cut sheets had contrast ratios of not less than 80, and good results were obtained repeatedly as to bistability, coloration, etc.

Example 4

The following ferroelectric polymeric liquid crystal:

Polyoxirane-type

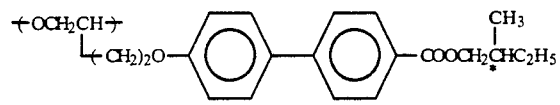

Mn = 2,800

Phase transition behavior

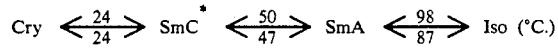

was used as the ferroelectric liquid crystal material.

Bisphenol A type diglycidyl ether (EPICOAT 828 D produced by Yuka Shell Epoxy Co., Ltd.) as a resin having crosslinking ability and 4,4'-diaminodiphenylmethane (DDM produced by Nakai Chemicals Co., Ltd.) as a hardening agent were used In combination as the non-liquid-crystalline polymeric material in a weight ratio of 6 (resin):4 (hardening agent). A mixture comprising the liquid crystal and the non-liquid-crystalline polymeric material in a weight ratio of 1:1 was dissolved in dichloromethane to prepare a solution of 15% by weight concentration, and the obtained solution was screen-printed on a PET substrate bearing ITO of 30 cm×50 cm (thickness: 125 μm). The printed layer directly after printing had a thickness of about 15 μm, and tile thickness was reduced to about 3.5 μ m after evaporating the solvent. Subsequently, after laminating a PES substrate bearing ITO (100 μm) as the opposite substrate, the obtained laminate was subjected to orienting treatment by bending treatment to obtain a liquid crystal device. The orienting treatment was conducted in the same manner as Example 2 excepting that $T_1=T_2=105°$ C., $T_2=80°$ C., and $T_4=60°$ C.

The contrast ratio and response time measured using crossed polarizers were 76 and 30 ms, respectively, at 28° C. under the applied voltages of ±15 V. The retardation value (Δn·d) was 0.23. There was observed no coloration owing to birefringence effect, and the obtained layer was capable of black and white display excelling in visibility. A sufficient histability was recognized by the fact that the transmittance was maintained by 100% till after the device was allowed to stood for 24 hours at 28° C. after switching electric field off. After the resin having crosslinking ability was cured, a part of the obtained device was cut out from the device and then subjected to a microscopic observation. According to the microscopic observation, the size of the liquid crystal capsules were about 3 μm almost uniformly.

Example 5

The ferroelectric polymeric liquid crystal used in Example 4 and an unsaturated polyester resin (ESTAR produced by Toyo Toatsu Co., Ltd.) were mixed in a weight ratio of 1 : 1 without using solvent. The obtained mixture was formed by press technique Into a film of 20 cm×20 cm and 6 μm in thickness. The obtained film was laminated with two PES substrates bearing ITO. After the resin was half cured, orienting treatment was conducted in the same matter as Example 4, and the contrast ratio was measured to be 80 at 28° C. under the applied voltages of ±15 V. The response time was 75 ms. The retardation value was measured to be Δn·d=0.26. According to microscopic observation, the size of liquid crystal capsule was 5 μm in average diameter. Coloration was hardly observed by visual observation, and response was uniform. 92% of the bistability directly after removal of electric field was retained till after standing the device for a week at 36° C.

Example 6

A 1:1 mixture of the ferroelectric low molecular weight liquid crystal used in Example 1 and a silicone resin having crosslinking ability (TSE 3450 produced by Toshiba Silicone Co., Ltd.) was dissolved in dichloromethane to obtain a 25% by weight solution. After the obtained solution was applied on a substrate by using a gravure coater, another substrate was laminated on the obtained layer. The substrates used were PES substrates bearing ITO (width: 30 cm). The layer between electrodes had a thickness of about 7 μm. An orienting treatment was carried out by using the apparatus as shown in Example 2 and under the conditions that $T_1=25°$ C., $T_2=60°$ C., $T_3=48°$ C., $T_4=25°$ C., and $V=1$ m/min.

The contrast ratio of the obtained device was measured to be 42 at 25° C. under the applied voltages of ±4 V, and the response time was 900 μs. The retardation value (Δn·d) was measured to be 0.22. According to microscopic observation, the liquid crystal parts and resin parts were distributed almost uniformly, and they were indistinguishable. Visual observation failed to recognize any coloration but white. 95% of the bistability directly after removal of electric field was retained till after allowing the device to stand for 1 hour at 36° C., showing excellent practicality of the produced device. After deforming the device at the radiuses of curvature down to 5 cm, the orientation state and the layer thickness were appeared to be maintained very stably.

Examples 7 to 12

(1) Ferroelectric low molecular weight liquid crystal I

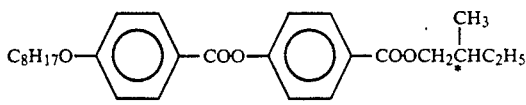

Phase transition behavior

-continued

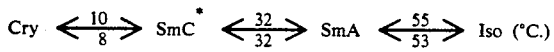 Cry $\xleftrightarrow[8]{10}$ SmC* $\xleftrightarrow[32]{32}$ SmA $\xleftrightarrow[53]{55}$ Iso (°C.)

(2) Ferroelectric low molecular weight liquid crystal II

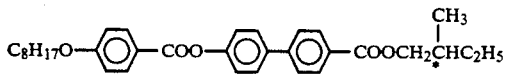

Phase transition behavior

 Cry $\xleftrightarrow[58]{84}$ SmC* $\xleftrightarrow[120]{121}$ SmA $\xleftrightarrow[165]{166}$ N* $\xleftrightarrow[171]{171}$ Iso (°C.)

(N*: chiral nematic phase)
(3) Ferroelectric polymeric liquid crystal

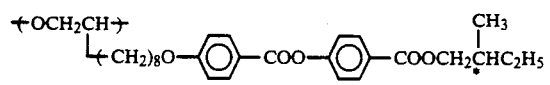

Mn = 3,000

Phase transition behavior

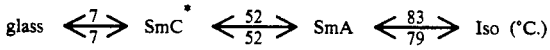 glass $\xleftrightarrow[7]{7}$ SmC* $\xleftrightarrow[52]{52}$ SmA $\xleftrightarrow[79]{83}$ Iso (°C.)

Mixtures comprising a liquid crystal mixture of the above (1) and (2) ((1):(2)=1:3) and the ferroelectric polymeric liquid crystal (3) in mixing molar ratios of ((1)+(2)):(3)=9:1 ($A_1$) and 4:6 ($A_2$) were prepared, and the phase transition behavior of each of the mixtures were examined to be as follows.

$A_1$

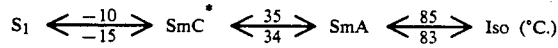 $S_1$ $\xleftrightarrow[-15]{-10}$ SmC* $\xleftrightarrow[34]{35}$ SmA $\xleftrightarrow[83]{85}$ Iso (°C.)

($S_1$: an unidentified phase exhibiting glass like state under microscopic observation. No crystallization occurred until the temperature is lowered down to −20° C.)

$A_2$

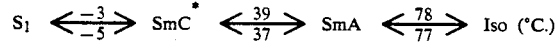 $S_1$ $\xleftrightarrow[-5]{-3}$ SmC* $\xleftrightarrow[37]{39}$ SmA $\xleftrightarrow[77]{78}$ Iso (°C.)

The mixed ferroelectric polymeric liquid crystal (3) stabilized the chiral smectic C phases of $A_1$ and $A_2$ at temperatures neighboring room temperature, and the possibility of destruction of orientation state was remarkably reduced even at low temperatures.

As thermoplastic resins, the following three were used.

$B_1$ Polychlorostyrene

Mw = 50,000, Tg = 90° C.

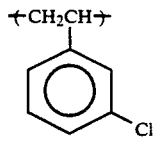

$B_2$ Poly-2-vinylpyridine

Mw = 40,000, Tg = 104° C.

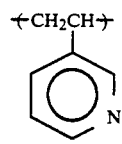

$B_3$ Polycarbonate

Mw = 20,000, Tg = 150° C.

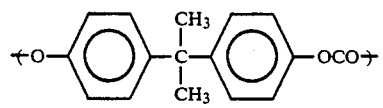

In order to examine the difference in effects of these thermoplastic resins, the mixing ratios between the ferroelectric liquid crystal material and the thermoplastic resins were uniformalized to 2:1 in weight ratio. Each of the mixtures were dissolved in dichloromethane to obtain a 10% by weight solution.

As the flexible substrates for supporting both sides of a liquid crystal layer, two PES (polyethersulfon) substrates bearing ITO (width: 150 mm, thickness: 125 μm) were used.

After application process was conducted by applying each of the above solutions on one rolled substrate by using a microgravure coater, the obtained substrate provided with a liquid crystal composition layer was laminated with the other opposite substrate by moving the obtained substrate together with the opposite substrate through between two pressure rollers. After lamination, the thickness of the ferroelectric liquid crystal compositions became approximately to 5 μm. The obtained laminates were subjected to an orienting treatment by bending treatment using the orienting apparatus as shown in FIG. 9.

Figure 9:
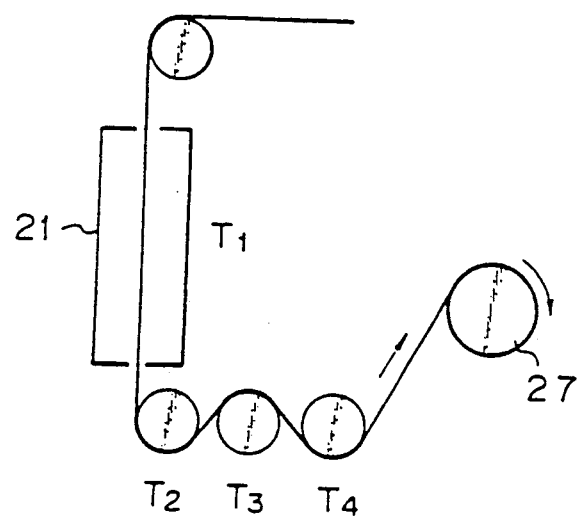
FIG. 9 is a schematic view illustrating an embodiment of the orienting method by bending treatment according to the present invention.

In the apparatus shown in FIG. 9, the temperatures of heating apparatus and orienting rolls (diameter: 100 mm) were adjusted to $T_1$=90° C., $T_2$=85° C., $T_3$=70° C., and $T_4$=40° C., the center distance between orienting rolls to 120 mm, the line speed to 3 m/min. After the orienting treatment, a liquid crystal optical device of 150 mm×200 mm for examination was cut out from each of the obtained device sheets, and its contrast ratio was measured by applying voltages of ±10 V between crossed polarizers. The results are shown in Table 1.

TABLE 1

| | Composition | Contrast ratio |
|---|---|---|
| Example 7 | $A_1/B_1$ | 55 |
| Example 8 | $A_1/B_2$ | 54 |
| Example 9 | $A_1/B_3$ | 36 |
| Example 10 | $A_2/B_1$ | 78 |
| Example 11 | $A_2/B_2$ | 80 |
| Example 12 | $A_2/B_3$ | 62 |

All of the obtained liquid crystal devices exhibited bistability, and the reduction of transmittance after allowing the devices to stand for 24 hours was as small as 5% or less.

The above results show that the lower the Tg of thermoplastic resin is, the more effective shear stress is applied to liquid crystal material at the time of bending treatment and the higher orientation state can be acquired. All of the devices were stable to bending treatment at room temperature, and no destruction of orientation state was occurred even by bending them at the radiuses of curvature down to 50 mm.

Example 13

In the same manner as Examples 7 to 12, liquid crystal optical devices were produced by using polyvinylacetate having a low Tg (Tg=32° C.) as a thermoplastic resin. The contrast ratio was 80 when using $A_1$ systems, and 71 when using $A_2$ systems. However, these devices were somewhat inferior in stability to deformation at room temperature, and re-orientation occurred by bending at the radius of curvature of about 100 mm and the contrast ratio decreased to 20 or less.

Example 14

In the same manner as Examples 7 to 12, application, lamination, and orienting treatment were carried out by using a mixture comprising a liquid crystal mixture comprising only (1) and (2) (molar ratio: 1:3) and the thermoplastic resin $B_1$ in a weight ratio of 2:1, to obtain a liquid crystal optical device. The contrast ratio of the obtained liquid crystal optical device was measured to be 42. From comparison with the result obtained in Example 7, it is apparent that the efficiency of orienting treatment can be extremely improved by adding ferroelectric polymeric liquid crystals in an amount of only 10%.

Example 15

A ferroelectric low molecular weight liquid crystal

The above bending treatment for orientation was conducted by the method as illustrated in FIG. 6 under the conditions that $T_1=90°$ C., $T_2=81°$ C., $T_3=40°$ C., line speed: 4.0 m/min., diameter of the orienting rolls: 100 mm, and center distance between rolls=120 mm.

After the obtained liquid crystal optical device was cut into a size of 200 mm × 180 mm, the contrast ratio of the cut device was measured to be 62 at 25° C. under the applied voltages of ±5 V.

Existence of bistability was confirmed all over the chiral smectic C phase temperature range not more than 35° C. A good stability to bending treatment was maintained at the radiuses of curvature down to 20 mm.

Comparative Example 2

In the same manner as Example 13 with the exception that no thermoplastic resin was used, application, lamination, and orienting treatment was carried out by using only the liquid crystal mixture as the liquid crystal material. While the contrast ratio was measured to be 105 at 25° C. under the applied voltages of ±5 V, a disturbance of orientation occurred in cutting process, and a severe destruction of orientation occurred at a radius of curvature not more than 70 mm.

From the above results, it was proved that the mixing of thermoplastic resin improves at temperatures neighboring room temperature the mechanical stability of liquid crystal layer, and becomes soft at the time of bending with heating to facilitate orientation control to liquid crystal. Also, the mixing of ferroelectric poly-

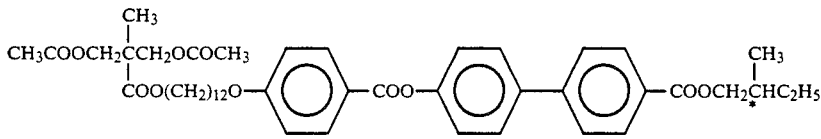

Phase transition behavior

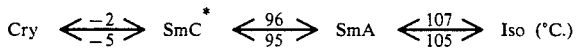

and the ferroelectric polymeric liquid crystal (3) used in Examples 7 to 12 were mixed in a molar ratio of 7:3, to obtain a liquid crystal mixture exhibiting the following phase transition behavior.

Phase transition behavior

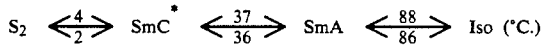

($S_2$: an unidentified phase. No crystallization occurred till the temperature was lowered to −30° C. at least.)

A mixture comprising the liquid crystal mixture and polyvinylchloride as thermoplastic resin in a weight ratio of 3:2 was dissolved in tetrahydrofuran (THF) to form a 15% by weight solution. The obtained solution was applied on a uniaxially stretched PET substrate bearing ITO (thickness: 100 μm, width: 200 mm), and a composite layer of about 6 μm in thickness was obtained after evaporating the solvent. After laminating an opposite substrate of the same kind as the above substrate, the obtained laminate was cooled from its isotropic phase while subjecting the laminate to bending treatment in a bending direction (roll temperature: 25° C., a=14°) which is adjusted so that it and the optically principal axis of the substrate make an angle corresponding to the tilt angle of the liquid crystal mixture.

meric liquid crystal further improves the orientation state. Since even small amounts of thermoplastic resin and ferroelectric polymeric liquid crystal sufficiently present these effects, there is no fear of damaging the high speed responsibility innate in ferroelectric liquid crystals.

Example 16

Ferroelectric polymeric liquid crystal

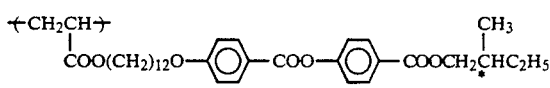

Mn = 5,300

Phase transition behavior

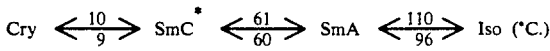

Figure 11:
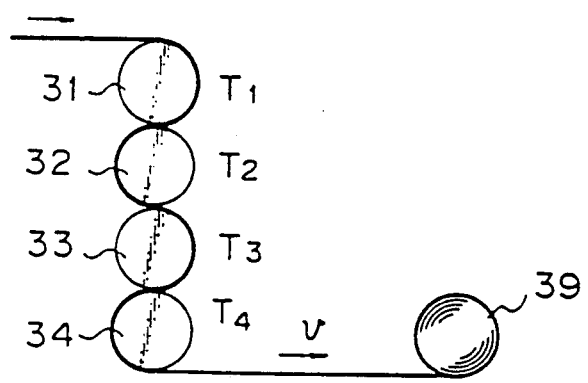

A ferroelectric liquid crystal composition was prepared by mixing 50 parts by weight of the above ferroelectric polymeric liquid crystal, 40 parts by weight of an epoxy resin (a mixture comprising EPICOAT 834 and QX-11 (hardening agent) produced by Yuka Shell Epoxy Co,. Ltd. in a weight ratio of 2:1), and 10 parts by weight of polyvinylacetate, and the obtained mixture was dissolved in dichloromethane to form a 15% by weight solution. The obtained solution was applied on a PES substrate bearing ITO (rolled type having a thickness of 125 μm, width of 15 cm, and length of 50 m) to form a layer having a thickness of 3 μm after evaporating the solvent. After laminating the same kind of PES substrate as the opposite substrate on the layer, the obtained laminate was subjected to an orienting treatment by moving the laminate through four rolls as shown in FIG. 11, to obtain a liquid crystal optical device. In FIG. 11, each of the referential numerals 31, 32, 33, and 34 represents a roll for bending orientation having a roll diameter of 80 φmm, and the referential numeral 39 represents a winding roll. The orienting treatment was conducted under the conditions that line speed v: 3 m/min., $T_1=115°$ C., $T_2=95°$ C., $T_3=90°$ C., and $T_4=25°$ C.

After the above orienting treatment, the obtained liquid crystal optical device was allowed to stand for about 1 hour at room temperature to cure tile epoxy resin almost completely. Subsequently, a liquid crystal cell of 15 cm×30 cm was cut out from tile device. When contrast ratio at room temperature was measured by using crossed polarizers, the measured contrast ratio was 28 under the applied voltages of ±5 V, which confirmed the good orientation state, and the display state was maintained for more than 24 hours even after switching electric field off.

As apparent from the above results, the method of this Example makes it possible to produce longitudinal devices continuously (application, lamination, orienting treatment, and cutting), and good orientation state can be attained easily.

When the mechanical strength of the liquid crystal cell was examined, the contrast and bistability were not changed by the normal pressures up to 10 kg/cm$^2$, nor by bending deformation at room temperature at the radiuses of curvature down to 3 cm.

Example 17

Ferroelectric polymeric liquid crystal I

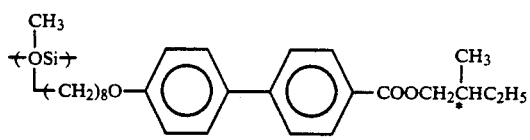

Mn = 15,000

Phase transition behavior

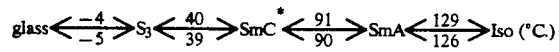

($S_3$: an unidentified smectic phase)
Ferroelectric polymeric liquid crystal II

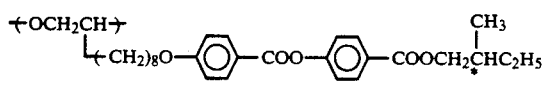

Mn = 3,000

Phase transition behavior

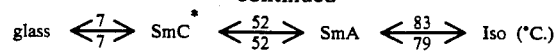

A mixture comprising the above two kinds of liquid crystals in a ratio of 50:50 (mol %) and a mixture comprising UV-curing acrylic adhesive (CEROMECK SUPER Y 862-1 produced by Cemedine Co,. Ltd.) and polyvinylpyridine (The weight ratio between adhesive and polyvinylpyridine was 4:1.) were mixed in a ratio of 3:1 to prepare a liquid crystal composition. The obtained ferroelectric liquid crystal composition was dissolved in acetone to form a 10% by weight solution.

Figure 12:
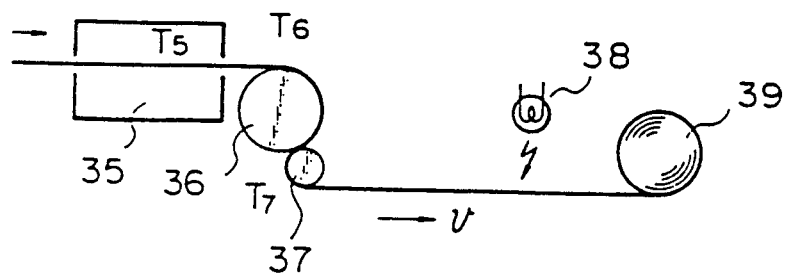
FIG. 12 is a schematically sectional view showing an apparatus used in Examples of the present invention for orienting a liquid crystal material by bending treatment.

Subsequently, the obtained solution was applied on a uniaxially stretched PET substrate bearing ITO (thickness: 100 μm, width: 200 mm, length: 20 m) by using a direct gravure coater, and then dried by heating it to 50° C. to evaporate the solvent. After drying, the thickness of the dried layer of liquid crystal composition became to 2.5 μm. Successively, after laminating an opposite substrate on the dried layer, the obtained laminate was subjected to a bending orientation treatment with two rolls as shown in FIG. 12. In FIG. 12, the referential numeral 35 represents a heating furnace, each of the referential numerals 36 and 37 represents a roll for bending orientation treatment, and the referential numeral 38 represents a metal hydride lump of 400 W. The bending orientation treatment was conducted under the conditions that roll diameter: 100 mm (roll 36) and 60 mm (roll 37), line speed: v=4 m/min., $T_5=130°$ C., $T_6=100°$ C., and $T_7=75°$ C.

Directly after the bending orientation treatment, UV-irradiation was carried out to cure the resin portion, and then the obtained device was cut into a device of several centimeter square. The contrast ratio of the device was measured by applying voltages of ±5 V to be 47 at 70° C., and 30 at 25° C. A display state was maintained for more than 72 hours even after switching electric field off, showing a good memory performance.

When the mechanical strength of the liquid crystal device was examined, the contrast and bistability were not reduced by the normal pressures up to more than 15 kg/cm$^2$, nor by bending deformation (room temperature) at the radiusus of curvature down to 2 cm.

Example 18

The ferroelectric polymeric liquid crystal used in Example 16 and the following thermoplastic poly-3-chlorostyrene:

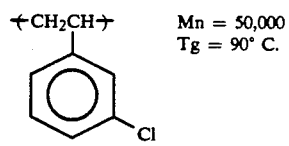

Mn = 50,000
Tg = 90° C.

were mixed in a weight ratio of 2:1 to prepare a ferroelectric liquid crystal composition. In the same manner as Example 16, a liquid crystal device was produced by forming a layer of 2.3 μm thickness and conducting orienting treatment under the conditions that line speed: v =3 m/min., $T_1=115°$ C., $T_2=95°$ C., $T_3=60°$ C., and $T_4 =25°$ C. The contrast ratio at room temperature was measured to be 26 under the applied voltages of ±5 V. When the mechanical strength of the liquid crystal device was examined, it was found that the orientation state was not disturbed by the normal pressures up to 7

Example 19

The following ferroelectric low molecular weight liquid crystal which exhibits only smectic C phase:

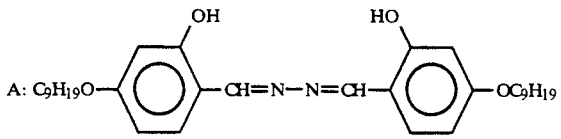

and the following ferroelectric low molecular weight liquid crystal which exhibits only smectic A phase:

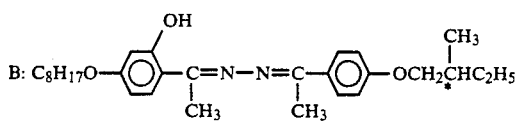

were mixed in a molar ratio of A:B=20:80 to prepare a ferroelectric liquid crystal material which exhibits chiral smectic C phase. The ferroelectric liquid crystal material showed the following phase transition behavior.

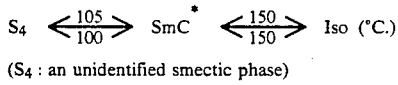

($S_4$ : an unidentified smectic phase)

A mixture comprising the obtained ferroelectric liquid crystal material and CEMEDINE HIGH SUPER produced by Cemedine Co., Ltd. (a mixture comprising main agent and hardening agent In a weight ratio of 1:1) in a ratio of 80:20 (% by weight) was dissolved in dichloromethane to form a 20% by weight solution. The obtained solution was applied on a PES substrate bearing ITO (width: 20 cm, thickness: 100 μm, length: 5 m) by using a roll coater to form a layer having a thickness of about 3.5 μm after evaporating the solvent. Then, an opposite substrate having been applied with nothing was immediately laminated on the layer by using two rolls to produce a device yet to be subjected to orienting treatment. The device was cut into pieces of 30 cm in length, and the obtained cut-sheet devices were placed on a PET belt as shown in FIG. 7 with the angle θ set to 22.5°, and then the belt carrying the cut sheet devices was moved through an apparatus as shown in FIG. 9 to conduct orienting treatment. The orienting treatment was conducted under the conditions that line speed: 5.5 m/min., $T_1$=163° C., $T_2$=143° C., $T_3$=143° C., and $T_4$=120° C. The adhesive was completely cured in about 30 minutes after winding the belt, and the devices were then removed from the PET belt and heated again to 120 ° C. The contrast ratio of the heated devices was measured using crossed polarizers to be 50 under applied voltages of ±5 V. The orientation was not damaged down to the radiuses of curvature down to 5 cm even by bending the device in any direction.

Example 20

The liquid crystal A and B used in Example 19 and the following polymeric liquid crystal which exhibits smectic C phase:

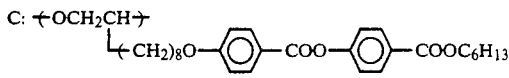

Mn: 4,000 were mixed in a molar ratio of A:B:C=64:16:20 to prepare a ferroelectric liquid crystal material exhibiting the following phase transition behavior.

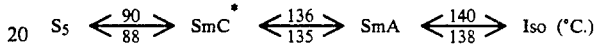

($S_5$: an unidentified smectic phase)

Formation of layer of ferroelectric liquid crystal composition, lamination, and orienting treatment were conducted in the same manner as Example 19. The obtained layer of liquid crystal part had a thickness of about 3.3 μm. The orienting treatment was conducted under the conditions that line speed: 5.5 m/min., $T_1$=148° C., $T_2$=129° C., $T_3$=125° C., and $T_4$=90° C.

The adhesive was completely cured by standing the obtained devices at room temperature for about 30 minutes after winding the belt, and the devices were then removed from the PET belt and heated again to 100° C. The contrast ratios of the heated devices were measured by using crossed polarizers to be 71 under applied voltages of ±5 V. The orientation was not damaged by bending the device in any direction at the radiuses of curvature down to 5 cm.

Example 21

A liquid crystal mixture comprising the following polymeric liquid crystal which exhibits smectic C phase:

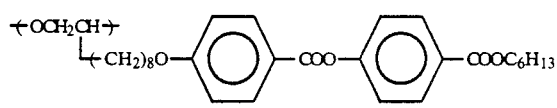

Mn = 4,000 and the following ferroelectric low molecular weight liquid crystal:

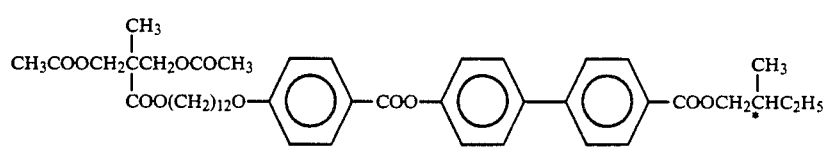

in a molar ratio of 20:80 was used as ferroelectric liquid crystal material. The liquid crystal mixture exhibited the following phase transition behavior.

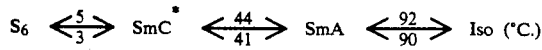

(S₆: an unidentified smectic phase)

A mixture comprising the ferroelectric liquid material and polyisobutylmethacrylate (PiBMA, Tg=50° C.) in a weight ratio of 90:10 was dissolved in 1,1,1-trichloroethane to form a 5% by weight solution. The obtained solution was applied on a substrate of the same kind as that used in Example 20 by using a microgravure coater. After an opposite substrate which had been applied with the solution in the same manner was laminated on the above substrate, and the thickness of the liquid crystal layer became to 2.7 μm. An orienting treatment was conducted by using an apparatus as shown in FIG. 10 under the conditions that $T_1 = 25°$ C., $T_2 = 100°$ C., $T_3 = 80°$ C., $T_4 = 25°$ C., and line speed: $V = 8$ m/min. The contrast ratio of the obtained oriented device was measured by using crossed polarizers to be 90 at 25° C. under applied voltages of ±5 V. The orientation was not damaged by bending the device in any direction till at the radiuses of curvature down to 7 cm.

What is claimed is:

1. A ferroelectric liquid crystal composition comprising from 40 to 97% by weight of (A) a ferroelectric liquid crystal material and from 3 to 60% by weight of (B) a non-liquid-crystalline polymeric material selected from the group consisting of a thermoplastic resin, a crosslinkable resin and a mixture thereof; the (A) ferroelectric liquid crystal material comprising at least 3 mol % of at least one ferroelectric polymeric liquid crystal having a number average molecular weight of at least 1,000 and being selected from the group consisting of a polyacrylate-type ferroelectric polymeric liquid crystal having the repeating units represented by the following general formula:

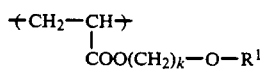

wherein
k is an integer having a value of 1 to 30,
R¹ is

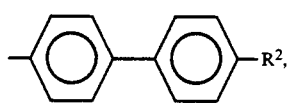

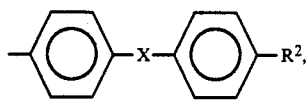

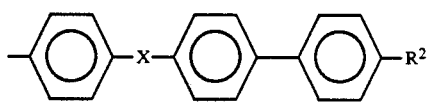

or

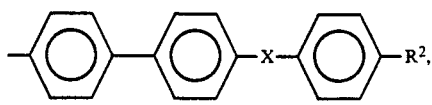

X is —COO— or —OCO—,
R² is —COOR³, —OCOR³, —OR³ or —R³,
wherein R³ is

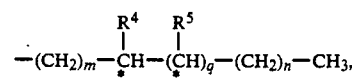

wherein
each of m and n is independently an integer having a value of 0 to 9,
q is an integer having a value of 0 or 1,
each of R⁴ and R⁵ is independently —CH₃, a halogen atom or —CN, with the proviso that when R⁵ is —CH₃, n is not an integer having a value of 0, and that when q is 0 and R⁴ is —CH₃, n is not an integer having a value of 0, and C* represents an asymmetric carbon atom;
a polyether-type ferroelectric polymeric liquid crystal having the repeating units represented by the following general formula:

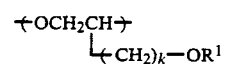

wherein k and R¹ are as defined above;
a polysiloxane-type ferroelectric polymeric liquid crystal having the repeating units represented by the following general formula:

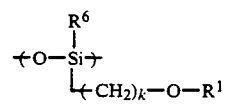

wherein R⁶ is a lower alkyl radical and k and R¹ are as defined above; and
polyester-type ferroelectric polymeric liquid crystals having the repeating units represented by the following general formula:

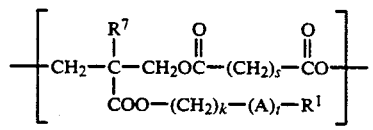

wherein
R⁷ is —H, —CH₃ or —C₂H₅,
s is an integer having a value of 1 to 20,
A is —O— or —COO—,
t is an integer having a value of 0 or 1, and
R¹ and k are as defined above or

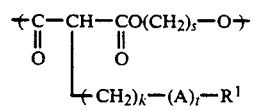

wherein s, A, t, R¹ and k are as defined above.

2. The ferroelectric liquid crystal composition as claimed in claim 1 wherein the (A) ferroelectric liquid crystal material comprises at least one kind of ferroelectric polymeric liquid crystal.

3. The ferroelectric liquid crystal composition as claimed in claim 1 wherein the (A) ferroelectric liquid crystal material is a mixture of at least one kind of ferroelectric polymeric liquid crystal and at least one kind of ferroelectric low molecular weight liquid crystal.

4. The ferroelectric liquid crystal composition as claimed in claim 1 wherein the (A) ferroelectric liquid crystal material is a mixture of at least one kind of ferroelectric polymeric liquid crystal and at least one kind of non-ferroelectric low molecular weight liquid crystal.

5. The ferroelectric liquid crystal composition as claimed in claim 1 wherein the (B) non-liquid-crystalline polymeric material comprises of at least one kind of thermoplastic resin having a glass transition temperature of not lower than 30° C.

6. The ferroelectric liquid crystal composition as claimed in claim 1 wherein the (B) non-liquid-crystalline polymeric material comprises at least one kind of thermosetting crosslinkable resin or photo-curable crosslinkable resin.

7. A method of producing a liquid crystal optical device, which method comprises orienting a liquid crystal optical device yet to be oriented which comprises
two flexible substrates that are parallel to each other, have surfaces facing each other on which are disposed respective electrode layers, and support a layer of the ferroelectric liquid crystal composition of claim 1 therebetween; by subjecting the liquid crystal optical device yet to be oriented to a bending treatment.

8. The method of producing a liquid crystal optical device as claimed in claim 7 wherein
the liquid crystal optical device yet to be oriented is subjected to a bending treatment within a temperature range in which the ferroelectric liquid crystal composition exhibits a coexisted phase of isotropic phase and smectic A phase, a coexisted phase of isotropic phase and chiral smectic C phase, smectic A phase or chiral smectic C phase or
the liquid crystal optical device yet to be oriented is subjected to a bending treatment while the liquid crystal optical device yet to be oriented is being cooled from a temperature at which the ferroelectric liquid crystal composition exhibits isotropic phase, a coexisted phase of isotropic phase and smectic A phase or a coexisted phase of isotropic phase and chiral smectic C phase to a temperature at which the ferroelectric liquid crystal composition exhibits smectic A phase or chiral smectic C phase.

9. The method of producing a liquid crystal optical device as claimed in claim 7 or 8 wherein the (A) ferroelectric liquid crystal material comprises of at least one kind of ferroelectric polymeric liquid crystal.

10. The method of producing a liquid crystal optical device as claimed in claim 7 or 8 wherein the (A) ferroelectric liquid crystal material is a mixture of at least one kind of ferroelectric polymeric liquid crystal and at least one kind of ferroelectric low molecular weight liquid crystal.

11. The method of producing a liquid crystal optical device as claimed in claim 7 or 8 wherein the (A) ferroelectric liquid crystal material is a mixture of at least one kind of ferroelectric polymeric liquid crystal and at least one kind of non-ferroelectric low molecular weight liquid crystal.

12. The method of producing a liquid crystal optical device as claimed in claim 7 or 8 wherein the (B) non-liquid-crystalline polymeric material comprises at least one kind of thermoplastic resin having a glass transition temperature of not lower than 30° C.

13. The method of producing a liquid crystal optical device as claimed in claim 7 or 8 wherein the (B) non-liquid-crystalline polymeric material comprises at least one kind of thermosetting crosslinkable resin or photo-curable crosslinkable resin.

14. The method of producing a liquid crystal optical device as claimed in claim 7 or 8 wherein the liquid crystal optical device yet to be oriented is subjected to a bending treatment with the bending direction of the bending treatment adjusted so that the bending direction and the optically principal axis (orientation direction) of at least one of the substrates approximately make, on the plane of the substrate, the tilt angle $\theta$ of the ferroelectric liquid crystal composition or $90° - \theta$, or so that the bending direction and the longitudinal direction of the substrates approximately make, on the planes of the substrates, the tilt angle $\theta$ of the ferroelectric liquid crystal composition or $90° - \theta$.

15. The method of producing a liquid crystal optical device as claimed in claim 14 wherein the (A) ferroelectric liquid crystal material comprises at least one kind of ferroelectric polymeric liquid crystal.

16. The method of producing a liquid crystal optical device as claimed in claim 14 wherein the (A) ferroelectric liquid crystal material is a mixture of at least one kind of ferroelectric polymeric liquid crystal and at least one kind of ferroelectric low molecular weight liquid crystal.

17. The method of producing a liquid crystal optical device as claimed in claim 14 wherein the (A) ferroelectric liquid crystal material is a mixture of at least one kind of ferroelectric polymeric liquid crystal and at least one kind of low molecular weight liquid crystal.

18. The method of producing a liquid crystal optical device as claimed in claim 14 wherein the (B) non-liquid-crystalline polymeric material comprises at least one kind of thermoplastic resin having a glass transition temperature of not lower than 30° C.

19. The method of producing a liquid crystal optical device as claimed in claim 14 wherein the (B) non-liquid-crystalline polymeric material comprises at least one kind of thermosetting crosslinkable resin or photo-curable crosslinkable resin.

20. A method of producing a liquid crystal optical device, which method comprises
providing a layer of the ferroelectric liquid crystal composition of claim 1 wherein the non-liquid-crystalline polymeric material is a crosslinkable resin on an electrode layer disposed on a substrate,
laminating on the layer of the ferroelectric liquid crystal composition another substrate on which disposed is an electrode layer, so that the layer of the ferroelectric liquid crystal composition is disposed between the electrode layers, and
crosslinking sufficiently the crosslinkable resin.

21. A method of producing a liquid crystal optical device, which method comprises, in sequence,
providing a layer of the ferroelectric liquid crystal composition of claim 1 wherein the non-liquidcrystalline polymeric material is a crosslinkable resin on an electrode layer disposed on a substrate, laminating on the layer of the ferroelectric liquid crystal composition another substrate on which disposed is an electrode layer, so that the layer of the ferroelectric liquid crystal composition is disposed between the electrode layers, to obtain a liquid crystal optical device yet to be oriented, uniaxially orienting the ferroelectric liquid crystal composition enclosed in the liquid crystal optical device yet to be oriented, and crosslinking the crosslinkable resin enclosed in the oriented liquid crystal optical device.

22. The method of producing a liquid crystal optical device as claimed in claim 21 wherein the substrate is a flexible substrate and the uniaxial orientation of the ferroelectric liquid crystal composition is conducted by subjecting the liquid crystal optical device yet to be oriented to a bending treatment.

23. The method of producing a liquid crystal optical device as claimed in claim 22 wherein the liquid crystal optical device yet to be oriented is subjected to a bending treatment within a temperature range in which the ferroelectric liquid crystal composition exhibits a coexisted phase of isotropic phase and smectic A phase, a coexisted phase of isotropic phase and chiral smectic C phase, smectic A phase or chiral smectic C phase or the liquid crystal optical device yet to be oriented is subjected to a bending treatment while the liquid crystal optical device yet to be oriented is being cooled from a temperature at which the ferroelectric liquid crystal composition exhibits isotropic phase, a coexisted phase of isotropic phase and smectic A phase or a coexisted phase of isotropic phase and chiral smectic C phase to a temperature at which the ferroelectric liquid crystal composition exhibits smectic A phase or chiral smectic C phase.

24. The method of producing a liquid crystal optical device as claimed in claim 22 or 23 wherein the liquid crystal optical device yet to be oriented is subjected to a bending treatment with the bending direction of the bending treatment adjusted so that the bending direction and the optically principal axis (orientation direction) of at least one of the substrates approximately make, on the plane of the substrate, the tilt angle $\theta$ of the ferroelectric liquid crystal composition or $90° - \theta$, or so that the bending direction and the longitudinal direction of the substrates approximately make, on the planes of the substrates, the tilt angle $\theta$ of the ferroelectric liquid crystal composition or $90° \, \theta$.

* * * * *